US011873974B2

(12) United States Patent
York et al.

(10) Patent No.: US 11,873,974 B2
(45) Date of Patent: Jan. 16, 2024

(54) PLANT GROWTH LIGHTING SYSTEMS

(71) Applicant: Quarkstar LLC, Las Vegas, NV (US)

(72) Inventors: Allan Brent York, Fort Langley (CA); Louis Lerman, Las Vegas, NV (US); Hans Peter Stormberg, Stolberg (DE); Ferdinand Schinagl, North Vancouver (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 17/461,331

(22) Filed: Aug. 30, 2021

(65) Prior Publication Data
US 2022/0228724 A1 Jul. 21, 2022

Related U.S. Application Data

(63) Continuation of application No. 16/095,643, filed as application No. PCT/US2017/028971 on Apr. 21, 2017, now Pat. No. 11,102,937.
(Continued)

(51) Int. Cl.
F21V 7/00 (2006.01)
A01G 9/24 (2006.01)
(Continued)

(52) U.S. Cl.
CPC ............ F21V 7/0008 (2013.01); A01G 7/045 (2013.01); A01G 9/249 (2019.05); A01G 9/26 (2013.01);
(Continued)

(58) Field of Classification Search
CPC ......... F21V 7/0008; F21V 7/04; A01G 9/249; A01G 9/26; A01G 7/045; G02B 6/0073; Y02A 40/25
(Continued)

(56) References Cited

U.S. PATENT DOCUMENTS 4,740,048 A 4/1988 Mori
10,314,243 B2 6/2019 Speer
(Continued)

FOREIGN PATENT DOCUMENTS

JP WO12169357 12/2012
JP 2013-039035 2/2013
(Continued)

OTHER PUBLICATIONS

International Search Report/Written Opinion, dated Jul. 11, 2017 by EPO; 18 pgs.
Translation of JP 2013-039035 (2013).

*Primary Examiner* — Laura K Tso
(74) *Attorney, Agent, or Firm* — Fish & Richardson P.C.

(57) ABSTRACT

A plant growth lighting system includes a plant support and a light guide luminaire module, the plant support being configured to hold one or more plants. The light guide luminaire module includes at least one light-emitting element (LEE), a light guide arranged to receive light emitted by the at least one LEE at a first end of the light guide and guide the received light in a forward direction to a second end thereof, and an extractor arranged to receive light from the second end of the light guide and configured to output light. The light guide luminaire module is disposed relative to the plant support such that at least a portion of the light output by the extractor impinges on the plants in predetermined directions.

15 Claims, 22 Drawing Sheets

Related U.S. Application Data

(60) Provisional application No. 62/341,577, filed on May 25, 2016, provisional application No. 62/326,633, filed on Apr. 22, 2016.

(51) Int. Cl.
 *A01G 9/26* (2006.01)
 *A01G 7/04* (2006.01)
 *F21V 8/00* (2006.01)
 *F21V 7/04* (2006.01)

(52) U.S. Cl.
 CPC .............. *G02B 6/0073* (2013.01); *F21V 7/04* (2013.01); *Y02A 40/25* (2018.01)

(58) Field of Classification Search
 USPC .......................................................... 362/418
 See application file for complete search history.

(56) References Cited

U.S. PATENT DOCUMENTS

| | | |
|---|---|---|
| 11,102,937 B2 * | 8/2021 | York .................... F21V 7/0008 |
| 2012/0140481 A1 * | 6/2012 | Simchak .................. F21V 7/09 |
| | | 362/296.07 |
| 2014/0204567 A1 | 7/2014 | Cheng |
| 2016/0192598 A1 | 7/2016 | Haggarty |
| 2016/0192599 A1 | 7/2016 | Yajima |
| 2016/0235014 A1 | 8/2016 | Donham |
| 2017/0254517 A1 | 9/2017 | Nijkamp |
| 2017/0367273 A1 | 12/2017 | Bylsma |
| 2018/0213735 A1 | 8/2018 | Vail |

FOREIGN PATENT DOCUMENTS

| | | |
|---|---|---|
| JP | WO13031400 | 3/2013 |
| WO | WO2009098617 | 8/2009 |
| WO | WO10109395 | 9/2010 |
| WO | WO2012002022 | 1/2012 |
| WO | WO15187448 | 12/2015 |

* cited by examiner

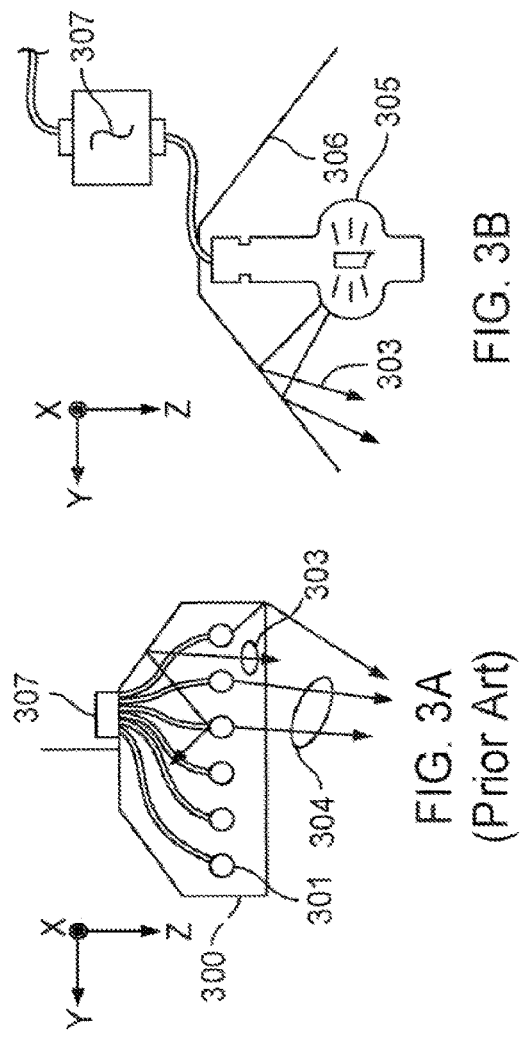
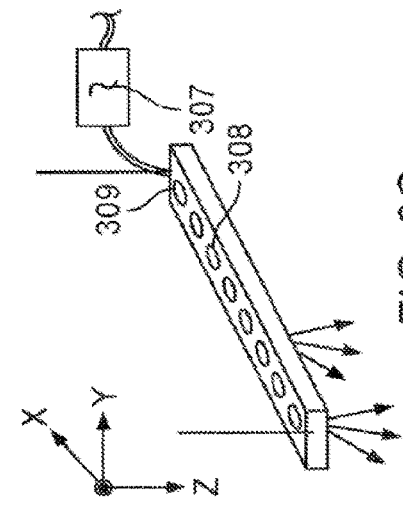
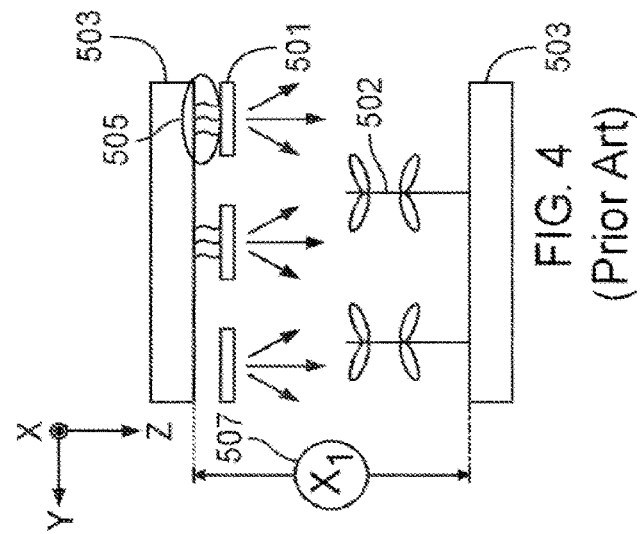
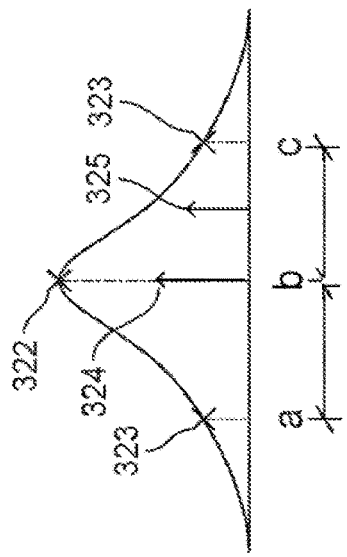
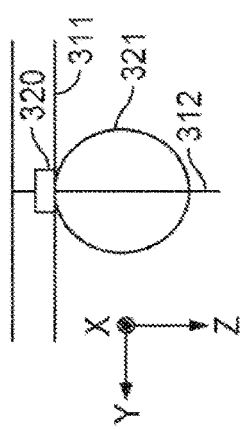
FIG. 3A (Prior Art)
FIG. 3B (Prior Art)
FIG. 3C (Prior Art)
FIG. 3D (Prior Art)
FIG. 3E (Prior Art)
FIG. 4 (Prior Art)

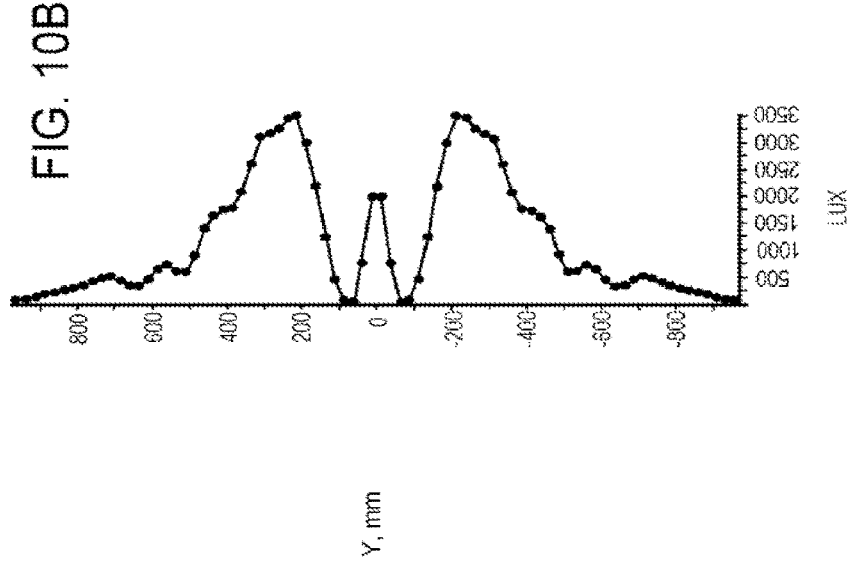
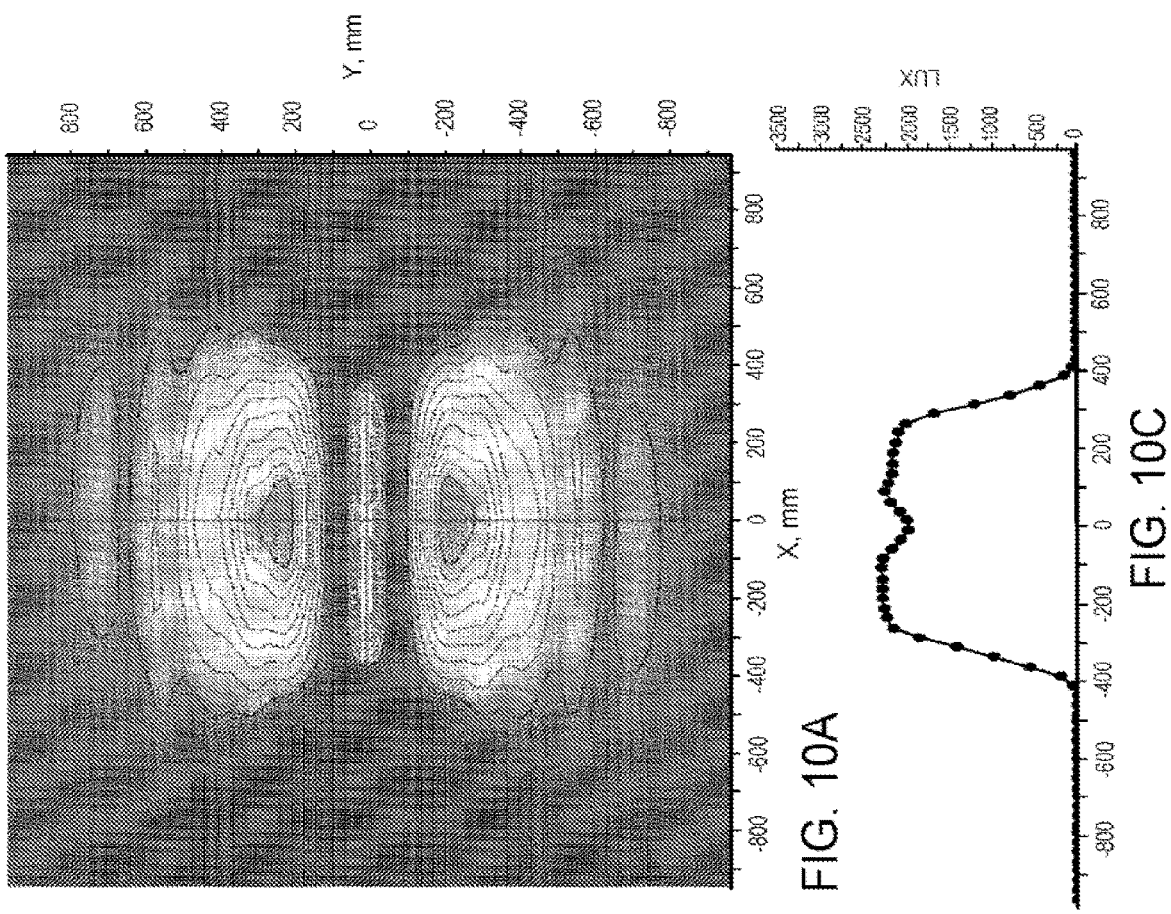

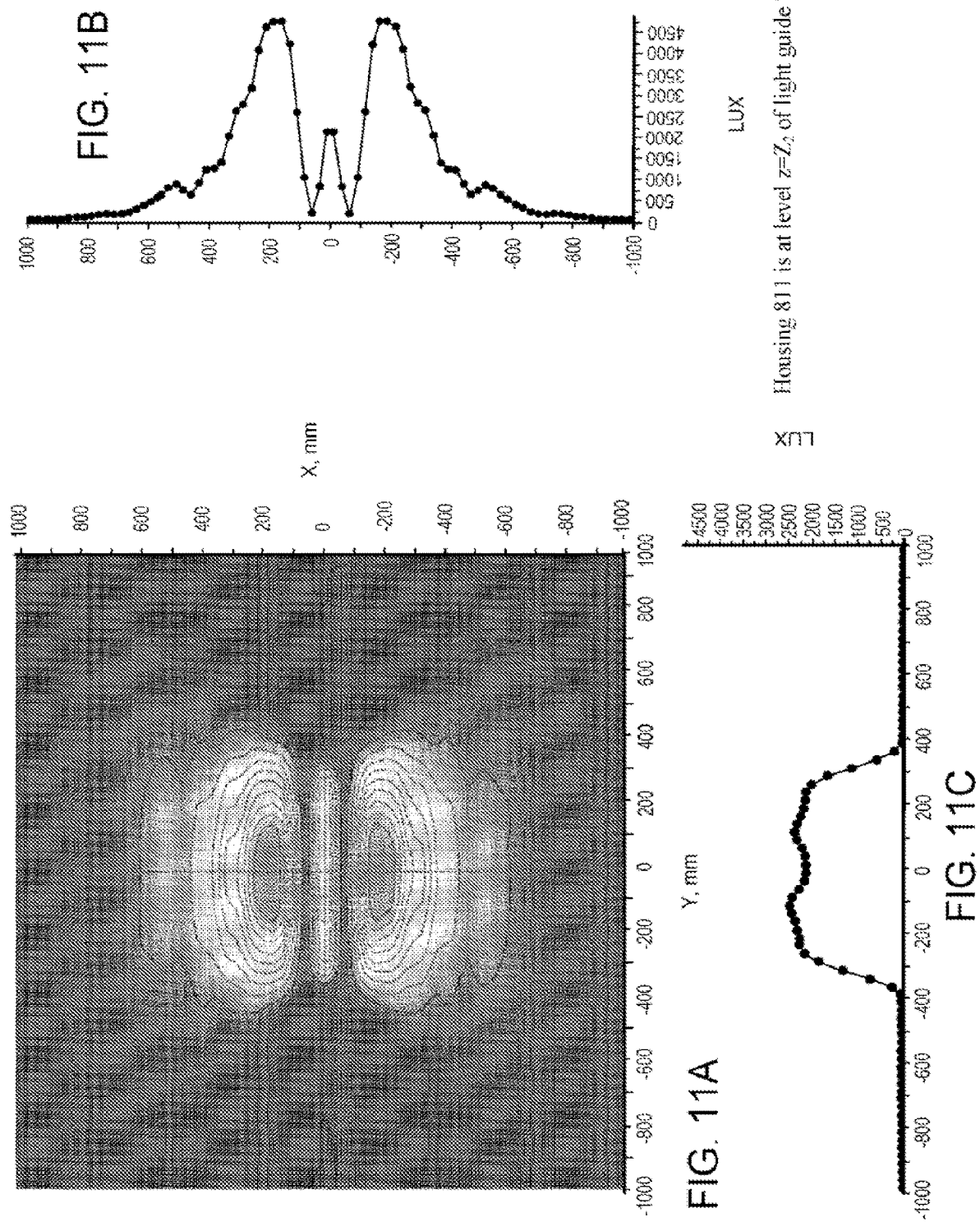

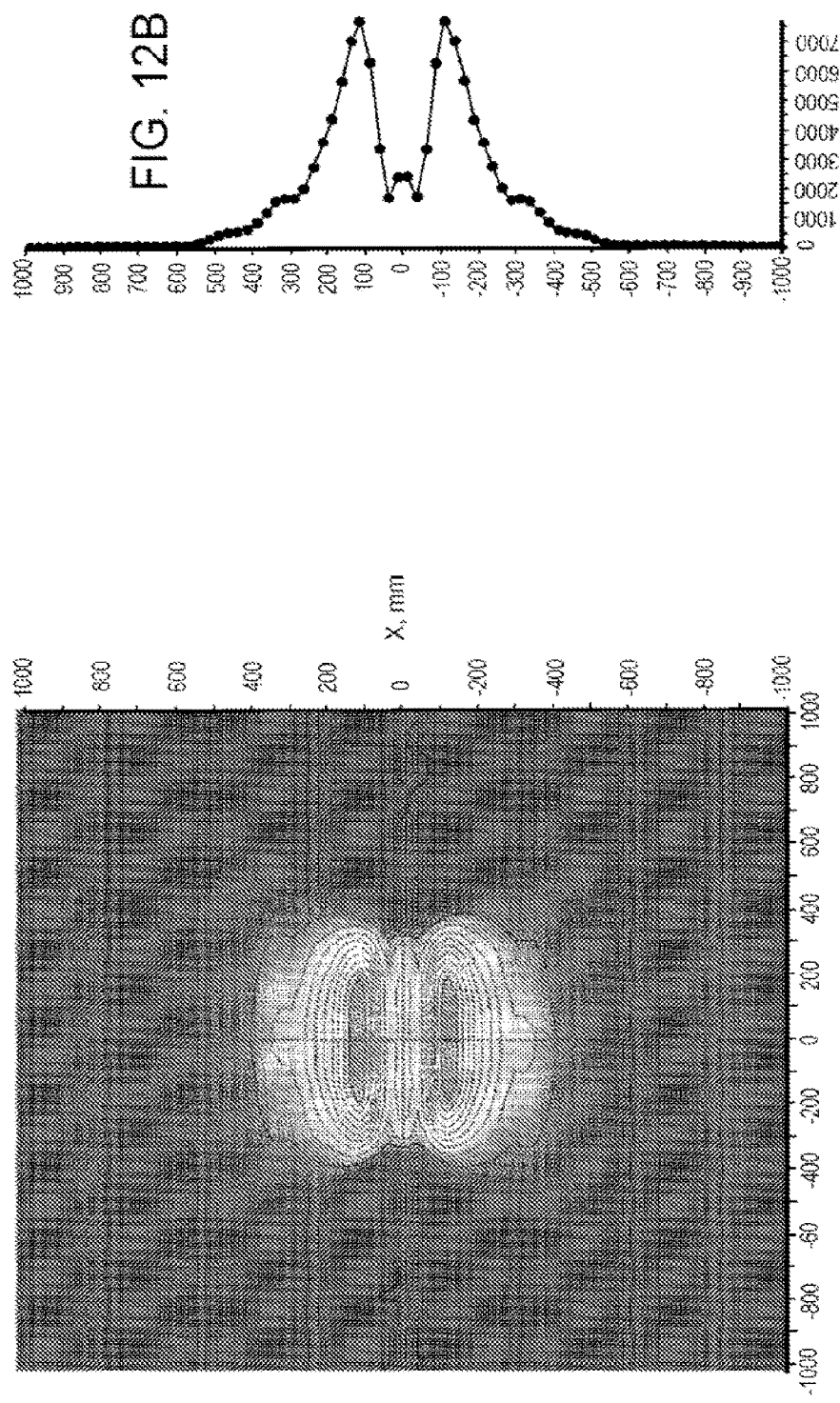
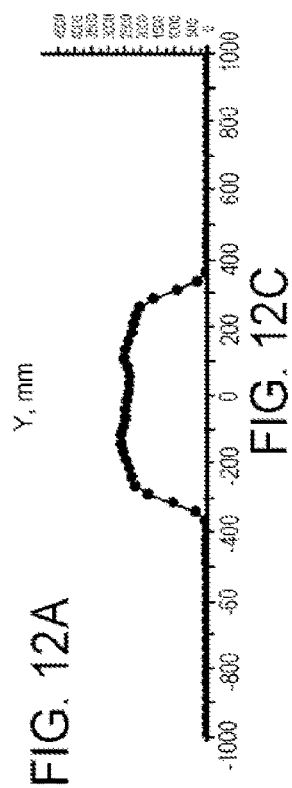
FIG. 12A
FIG. 12B
FIG. 12C

PLANT GROWTH LIGHTING SYSTEMS

CROSS-REFERENCE TO RELATED APPLICATIONS

This application is a continuation application of and claims priority to U.S. application Ser. No. 16/095,643, filed on Oct. 22, 2018, which is a U.S. National Phase application of International Application No. PCT/US2017/028971, filed on Apr. 21, 2017, which claims benefit under 35 U.S.C. § 119(e)(1) of U.S. Provisional Application No. 62/326,633, filed on Apr. 22, 2016, and of U.S. Provisional Application No. 62/341,577, filed on May 25, 2016, all of which are incorporated by reference herein.

FIELD OF THE TECHNOLOGY

The present technology relates to horticulture and more specifically to lighting systems for plant growth systems. The present technology is related to plant and biological growth systems with characteristics that can enhance yield and the expression of certain nutritional, pharmacological or commercial properties of plants, bacteria, algae and other life forms.

BACKGROUND OF THE TECHNOLOGY

Research has shown that plants and other biological systems may have certain properties enhanced by the manipulation of certain lighting conditions that change the wavelength, and the timing of certain lighting spectral qualities. For example, certain wavelengths of light can stimulate growth while others may trigger flowering.

Historically lighting for plant growth systems has typically been delivered by natural daylight in the open or within greenhouses where lighting can be supplemented by artificial light sources such as High Pressure Sodium (HPS), Metal Halide (MH), and more recently, solid-state or semiconductor light sources including Light Emitting Diodes (LEDs), laser diodes and other types of semiconductor light emitting devices which will hereinafter be referred to as Light Emitting Elements or LEE's.

LEDs and lasers typically are narrow band emitters and can be used in combination with light conversion elements such as quantum dots or other phosphors, which in turn can generate light of broader spectral composition. Many LEE's are orders of magnitude smaller in physical dimensions than conventional light sources such as HPS and MH.

The evolution of plant and biological life on earth has occurred under light that has widely varying conditions throughout the day and time of year and plants have highly sensitive mechanisms for harnessing light to express certain biological properties. While researchers study effects of spectral composition and timing, what is distinctly lacking in the field are lighting systems which can favorably impact the spatial control of light with practical and complementary lighting fixture designs and delivery mechanisms that can be adjusted to provide properly mixed and distributed light that is useful for plant growth.

SUMMARY OF THE TECHNOLOGY

The present technology is directed to lighting systems that leverage the scale of LEEs and that can improve plant growth factors such as size, yield, substance expression and other aspects of artificially illuminated plants. Specifically, the instant technology aims to enable a spatial dimension of light to be harnessed from new lighting apparatus designs that can be located in new and advantageous positions within a plant-growth environment. The present technology provides lighting systems that can mimic diurnal, seasonal and weather dependent lighting conditions both in spectral and spatial aspects. Furthermore, the present technology can be configured to control plant growth beyond variations of mimicry of natural lighting conditions and influence certain forces in plant growth to express substances that can help advance human health, and nutritional and commercial produce value. The present technology can be used to control spatial and temporal distribution of the light provided for plant growth and the spectral composition of the provided light in various ways. Moreover, direction, timing and spectral composition of the provided light can be controlled to adjust to plant size during growth.

According to an embodiment of the present technology, there is provided a plant growth lighting system comprising a plant support configured to hold one or more plants; and a light guide luminaire module comprising at least one LEE, a light guide arranged to receive light emitted by the at least one LEE at a first end of the light guide and guide the received light in a forward direction to a second end thereof, and an extractor arranged to receive light from the second end of the light guide and configured to output light, the light guide luminaire module disposed relative to the plant support such that at least a portion of the light output by the extractor impinges on the plants in predetermined directions.

The foregoing and other embodiments can each optionally include one or more of the following features, alone or in combination. In some implementations, the extractor can be configured to output backward light within a range of directions having a component antiparallel to the forward direction. In some cases, the extractor additionally can output forward light within a range around the forward direction. Optionally, the forward light has a forward spectrum and the backward light has a backward spectrum different from the forward spectrum. Here, the extractor can include a chromatic filter configured to provide a forward spectrum different from the backward spectrum.

In some implementations, the plant growth lighting system can include a shifting system configured to translate the light guide luminaire module relative to the plant support along a direction of growth of the plants. Here, the plant growth lighting system can further include a sensor system configured to monitor growth of the plants, the sensor system operatively coupled with a control system configured to control translation of the light guide luminaire module via the shifting system.

In some implementations, the light guide luminaire module can include a tertiary reflector arranged to redirect at least a portion of the light directly output by the extractor and is configured to direct at least a portion of the light in a predetermined manner.

In some implementations, the plant growth lighting system can include a reflector system spaced apart from the light guide luminaire module and arranged to receive at least a portion of light output by the extractor, the reflector system configured to direct the reflected light towards the plants. In some cases, the reflector system and the plant support can have the same dimensions perpendicular to the forward direction. In some cases, the reflector system can include two reflector elements arranged on either side of the light guide luminaire module and have translational symmetry along a direction perpendicular to the forward direction.

In some implementations, the plant growth lighting system can include two light guide luminaire modules configured to output light having different spectral power density distributions (SPDs) and to output the output light with the different SPDs in different directions.

In some implementations, the plant growth lighting system can include a control system operatively coupled with and configured to control the one or more LEEs. In some cases, the one or more LEEs can be configured to generate light having different spectral power density distributions (SPDs) and the control system can be configured further to control the SPD of the light output by the light guide luminaire module.

According to another embodiment of the present technology, there is provided an indirect plant growth lighting system with a primary narrow light distribution angle in at least one plane that is optically matched to a reflective surface to provide a desired distribution of light to plants.

The foregoing and other embodiments can each optionally include one or more of the following features, alone or in combination. In some implementations, the primary narrow distribution of light can have a full width half-maximum intensity distribution of less than 30 degrees. In some implementations, the reflective surface can exhibit both specular and diffuse reflectance characteristics. In some implementations, the components of reflectance can be at least 5% of the total light reflectance.

In some implementations, the lighting system can provide mixing of individual LEE source spectral content. In some implementations, the mixing of adjacent LEE sources at primary emission location can be higher than 90%.

In some implementations, the lighting system has a plurality of LEE spectral distributions. In some cases, the plurality of LEE spectral distributions can be controlled independently.

In some implementations, the timing and relative mixed spectral content is controlled by one of desired plant growth data or data representative of at least one desired plant growth characteristic. In some cases, the plant growth data can be derived from one of spectral reflectance information or spectral transmission information.

In some implementations, plant growth data can be obtained from chemical analysis of at least part of the plant or its byproducts as contained in the soil, water or air surrounding or having come into contact with the plant. In some implementations, plant growth data can be obtained from plant physical characteristics. In some implementations, the reflective surface substantially can reflect only predetermined spectral components of impinging light.

According to yet another embodiment of the present technology there is provided a second plant growth lighting system. A plurality of narrow light distributions of the second plant growth lighting system are each narrow in at least one plane optically matched to reflective surfaces of the second plant growth lighting system to provide a desired distribution of light to plants.

According to yet another embodiment of the present technology there is provided a third plant growth lighting system. A primary light emitting device of the third plant growth lighting system is in a remote location relative to a secondary light reflecting system of the third plant growth lighting system.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIG. 3A is a typical tubular lamp lighting fixture.

FIG. 3B is a typical high intensity discharge lamp fixture.

FIG. 3C is a typical Light Emitting Diode type light fixture.

FIG. 3D is a typical Lambertian radiation profile.

FIG. 3E is a projection of a Lambertian radiation profile in terms of illumination obeying the inverse square law on a horizontal surface.

FIG. 4 is a typical prior art lighting system as used in horticulture lighting.

FIGS. 10A-10C, 11A-11C and 12A-12C show aspects of a fully extended, partially extended and fully retracted, respectively, light guide luminaire module of the adjustable illumination device of FIG. 8.

Reference numbers and designations in the various drawings indicate exemplary aspects, implementations of particular features of the present disclosure.

DETAILED DESCRIPTION

Radiation that reaches the earth's surface includes an ever-changing composite of wavelengths of light coming from many different directions depending on time, season and weather, for example. Biological organisms have evolved under this scenario and it is known that the efficacy of plant growth and the optimization of certain characteristics can be enhanced by artificially manipulating certain attributes of the light. Much research is underway on changing the spectrum, timing, ambient gas composition, temperature, nutrient mix and humidity, to improve yields and develop specific recipes for certain crops. However, prior art systems for the lighting component typically employ high output static light placement points far away from the crops to ensure that the infrared radiation and localized heating is not detrimental to plant health. For example, conventional HPS, MH or fluorescent fixtures are typically placed well above the plant canopy to avoid thermal damage and to leverage a wider distribution of the light. This requires lots of space between the plant canopy and the light mounting points and generally increases the volumetric requirement for the plant growth area. Many plant growth illumination systems are also static in terms of their directional illumination and temporally uniform in their spectral content. Similarly, newer LED systems often consist of fixed large banks of mixed LED sources that have relatively wide distribution patterns that are close to Lambertian and that also need to be placed a distance from the plant canopy to avoid uneven spatial distribution and mutual plant shadowing from leaves, stems or other plant parts. There is a clear need to develop new lighting systems that are significantly more space efficient in terms of mounting location and light distribution.

Figure 1A:
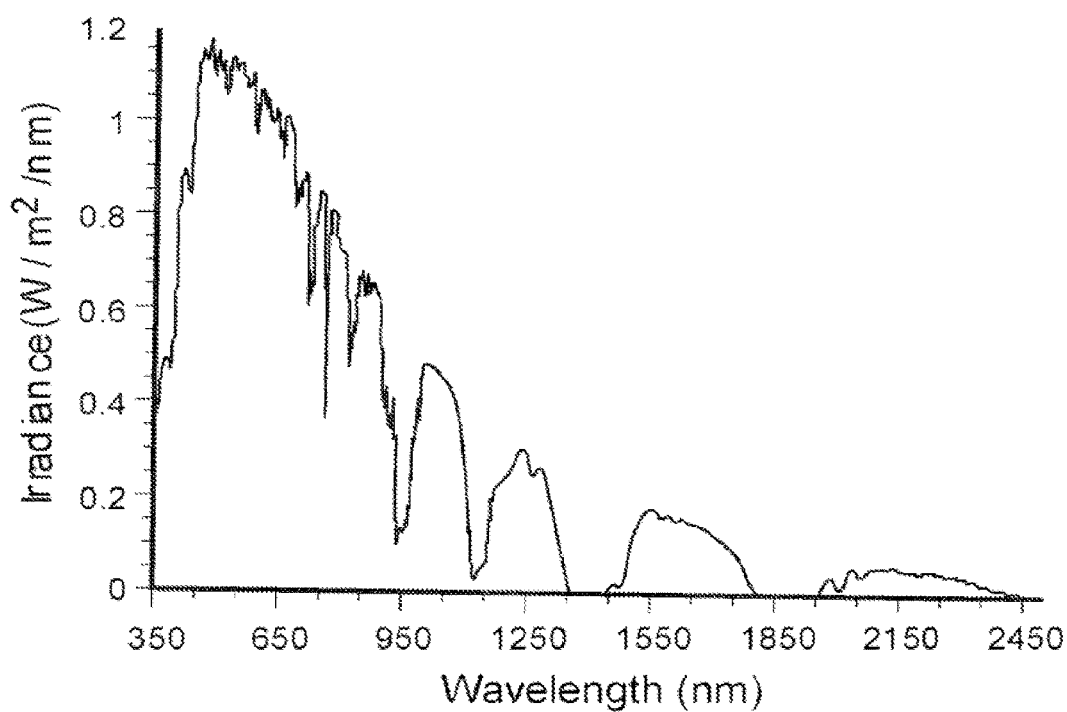
FIG. 1A is the typical total solar spectrum for light reaching the earth at sea level.
Figure 1B:
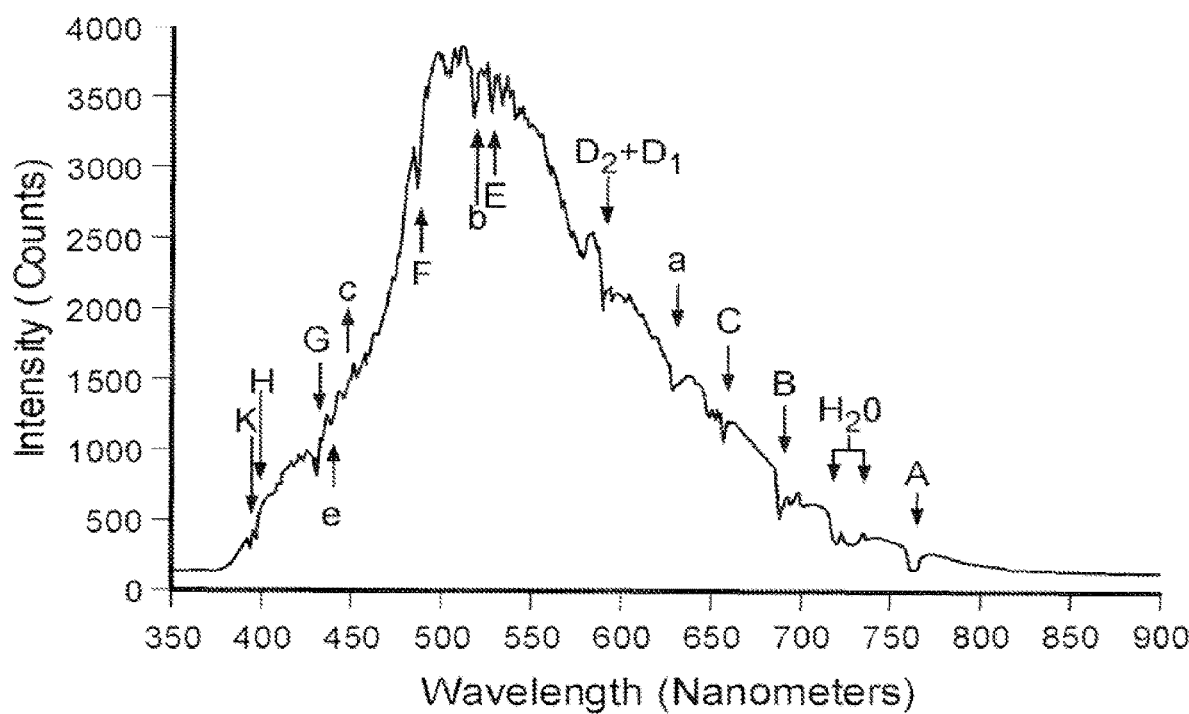
FIG. 1B is the typical spectrum for blue sky.
Figure 1C:
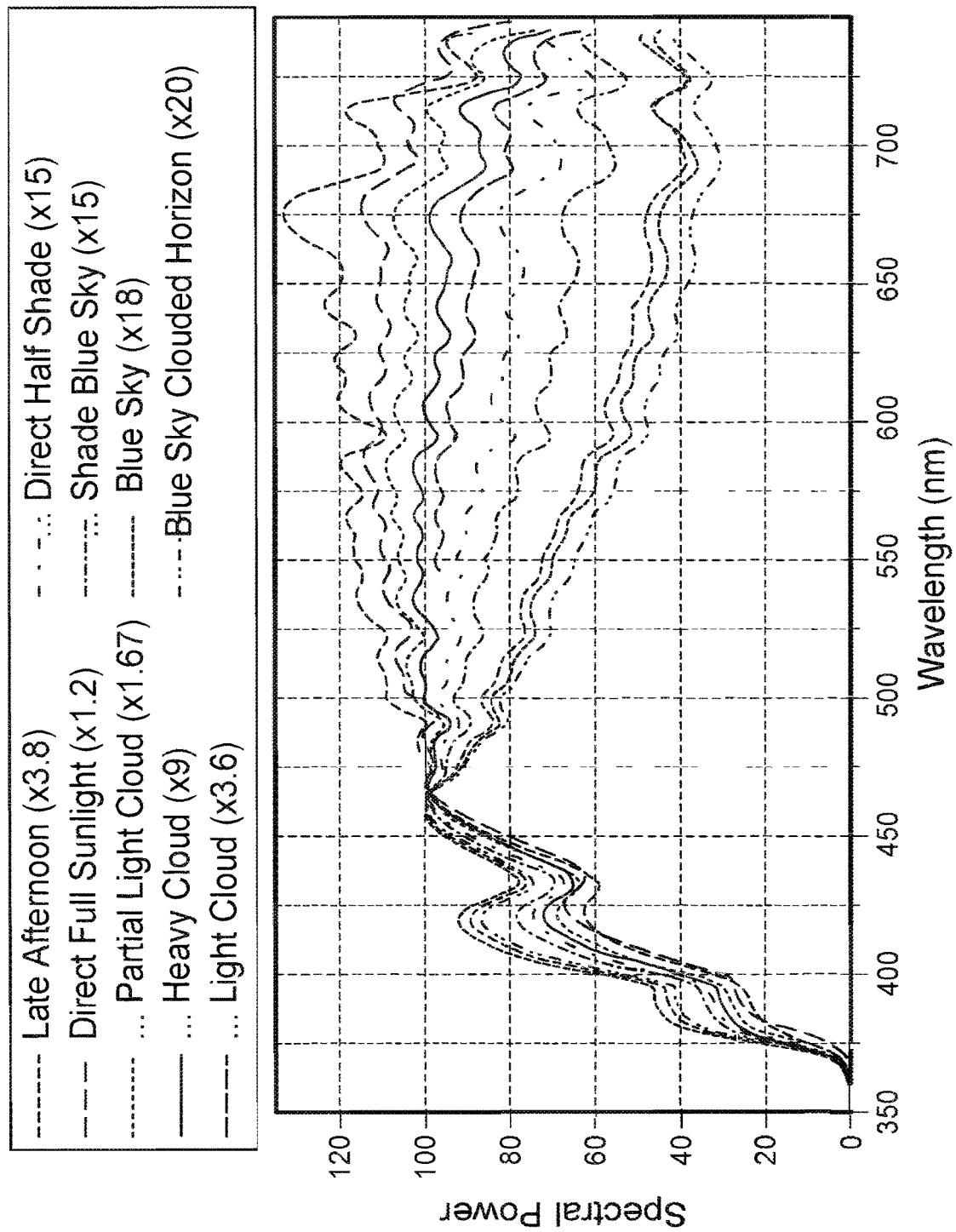
FIG. 1C is the range in solar spectrum variations due to cloud cover, haze and time of day.

FIG. 1A illustrates the typical combined solar spectrum for radiation reaching the Earth's surface at sea level. Notably the spectrum starts in the ultraviolet region and climbs upwards into the middle region of the visible light spectrum near 550 nanometers where it begins to taper off into the red and finally the infrared. This spectrum represents the typical combined daylight spectrum from the direct sunlight and blue sky. FIG. 1B illustrates the isolated blue sky spectrum component without direct sunlight. This spectrum is delivered by the blue sky dome and as such represents light that comes from all directions of the sky. FIG. 1C shows the variation in spectral power of various daylight components at various atmospheric conditions during daylight hours. The various spectra are normalized to 100% at about 460 nm. Notably, the blue sky components are generally fully diffused and reach the ground from all directions.

Figure 2A:
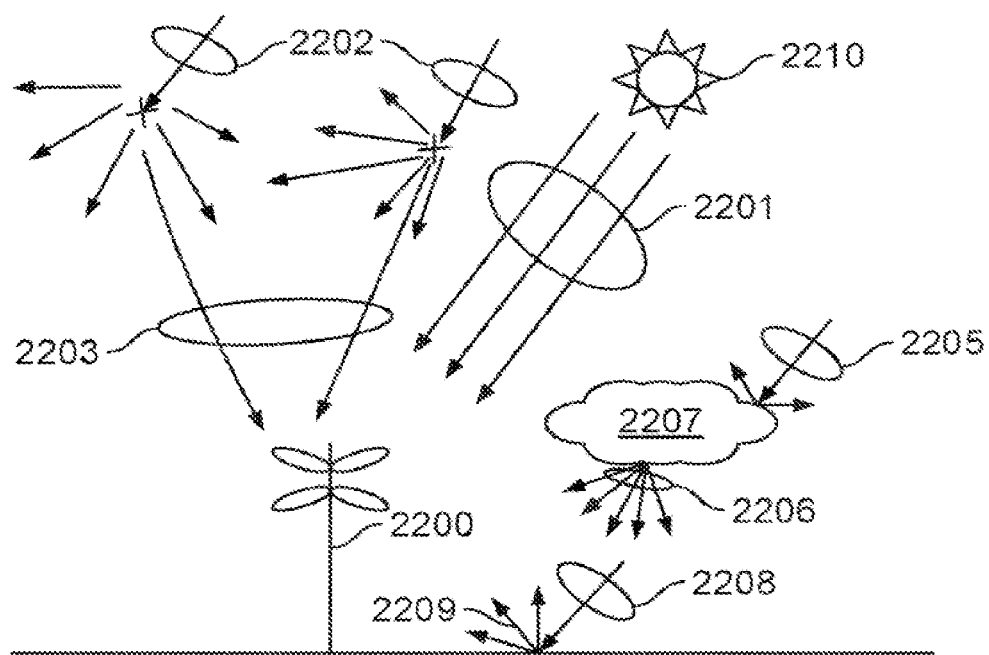
FIG. 2A is an elevation view of a typical plant in nature with constituent light components.
Figure 2B:
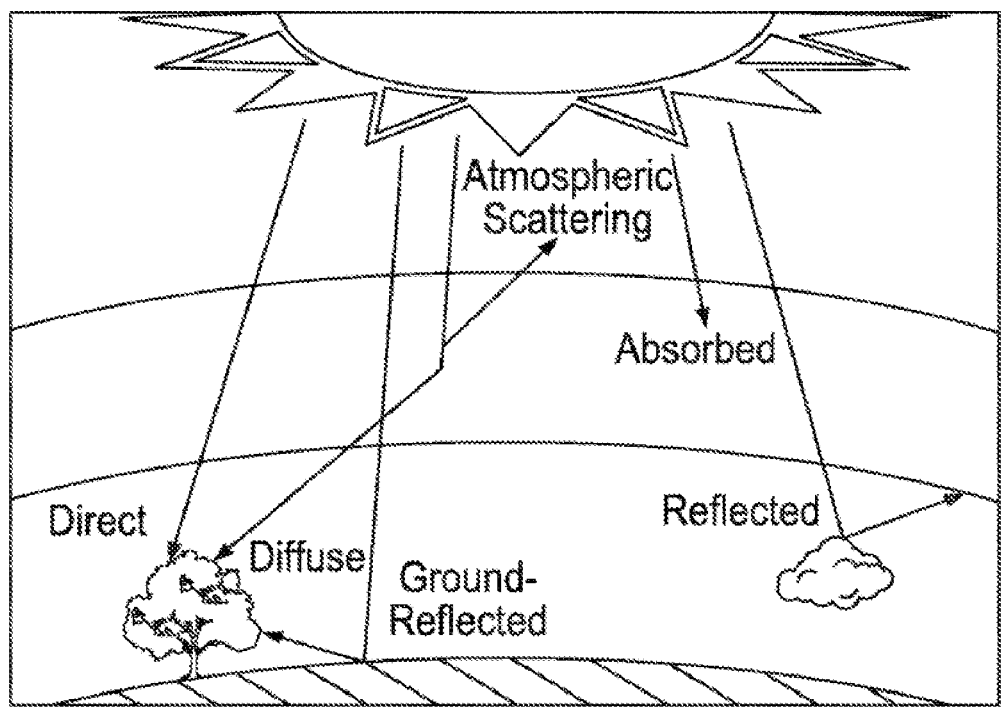
FIG. 2B is a schematic of solar radiation interactions in atmosphere and ground.

FIG. 2A is an elevation view of a typical plant 2200 in nature with constituent light components including direct sunlight 2201 provided by the sun 2210, atmospherically scattered light 2203 scattered by the atmosphere 2202, light 2206 from clouds 2207 and light 2209 from the ground, light 2208 received at ground level, and light 2205 received by clouds 2207. FIG. 2B is a schematic of solar radiation interactions in atmosphere and ground.

FIG. 3A shows a sectional view, e.g., in the (y,z) plane, of a typical tubular lamp lighting fixture 300 extending into the page, along the x-axis, and having a housing, ballast 307, and multiple light-emitting tubes 301. The fixture 300 has a reflective surface facing the tubes 301. The fixture 300 can emit direct light 304 directly emitted from the tubes and indirect light 303 reflected from the reflective surface. FIG. 3B shows a sectional view, e.g., in the (y,z) plane, of a typical high intensity discharge lamp fixture including a reflector 306, a bulb 305 and a ballast 307. FIG. 3C schematically shows a typical linear LED-based fixture 309 including multiple LEDs 308 in an elongate arrangement (e.g., extending along the x-axis) and drive electronics 307.

FIG. 3D shows a typical Lambertian radiation profile 321 relative to a surface 311 with surface normal 312. FIG. 3E shows a projection of a Lambertian radiation profile 321 from a Lambertian emitter 320 onto a plane coplanar with plane 311. The illumination in the coplanar plane obeys an inverse square law with a respective illuminance dropping from a maximum with axial distance, for example at points 323, 324 and 325, from the zenith 322.

FIG. 4 schematically shows a typical plant growth system including plants 502 grown in and located between growth trays 503 (also referred to as plant support(s)) separated by a height 507 from light fixtures 501. The light fixtures 501 are located such that heat 505 from the fixtures can be used to warm trays, water or other substances.

Figure 5A:
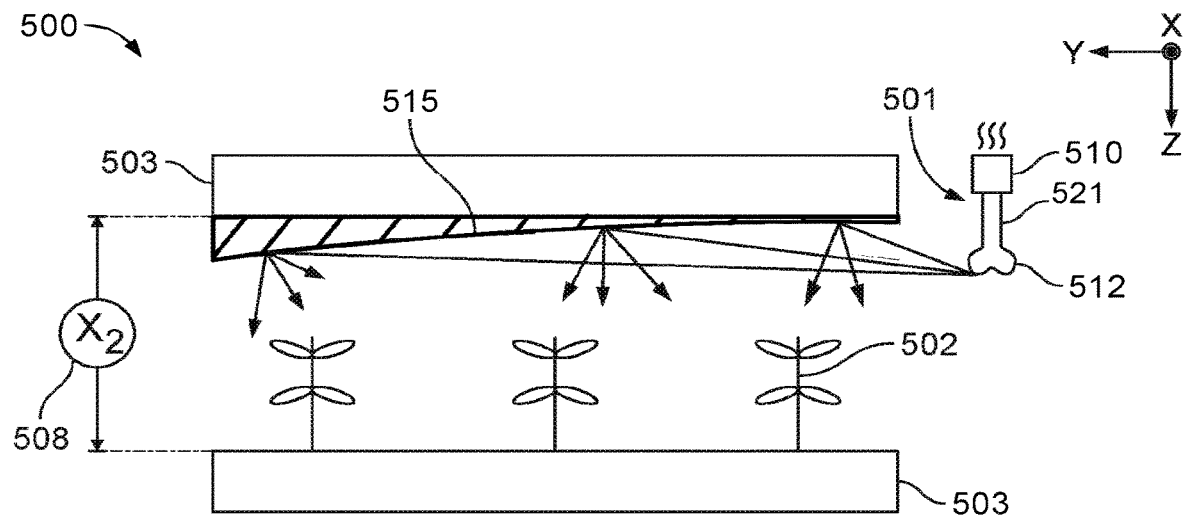
FIG. 5A is a first embodiment of the disclosed technologies with side firing optical extractors and reflective surfaces underneath the adjacent tray.

FIG. 5A shows a side view, e.g., in the (y,z) plane, of a plant growth lighting system 500, in short referred to as lighting system, for a plant-growth container according to an embodiment of the present technology. In this example, the lighting system 500 includes side-emitting, light guide luminaire modules 501. Each light guide luminaire module 501 includes a base supporting light emitting elements (LEEs) 510, light guide 521 and extractor 512, and a reflector 515 underneath the adjacent tray 503 with multiple trays spaced vertically by a vertical distance 508. In some implementations, the light guide luminaire modules are elongated along the x-axis. Examples of respective light guide luminaire modules and reflectors are described below in connection with FIGS. 7A-7B, 13 and 17A-17B, for instance. The reflector 515 can be shaped to illuminate plants 502 with a predetermined horizontal uniformity, e.g., as described below in connection with FIG. 5C. Good horizontal uniformity may improve certain plant growth factors.

Generally, the reflector 515 can have a curved shape (as indicated in FIG. 5A), be planar or otherwise shaped. Other shapes can include structures of sizes that are about one or more orders of magnitude smaller than the lateral extension of the reflector. Examples include macroscopic and microscopic shape variations including Fresnel reflectors.

According to an embodiment, the reflector 515 and the light guide luminaire modules 501 are configured to provide a high degree of spatially uniform illumination from grazing incident light. Such uniformity may occur in direction, lateral extension of the reflector 515 or both. Grazing incidence allows for compact systems with low overall height. Such systems may be stackable and as such improve economics from reduced foot print requirements.

According to another embodiment, the reflector 515 is configured to reflect different spectral components of incident light in different directions. Such a system further may be configured to control spectral composition of plant illumination by varying the spectral composition of the light provided by the light guide luminaire module 501, for example.

The reflector 515 may be configured to alter the spectral composition via selective reflection, absorption, conversion and/or other processes. For example, the reflector 515 may include chromatic filters such as interference filters or (remote) phosphor conversion substances so that it can filter certain spectral components of light when indirectly illuminating plants. This may be combined with spectral engineering of light at the source level, for example, at the LEEs 510.

Components of the lighting system 500 can be configured to form part of a plant-growth container. For example, reflector 515 can be configured to form part a cap of the plant-growth container or it can be attached to the bottom of the cap.

Figure 5B:
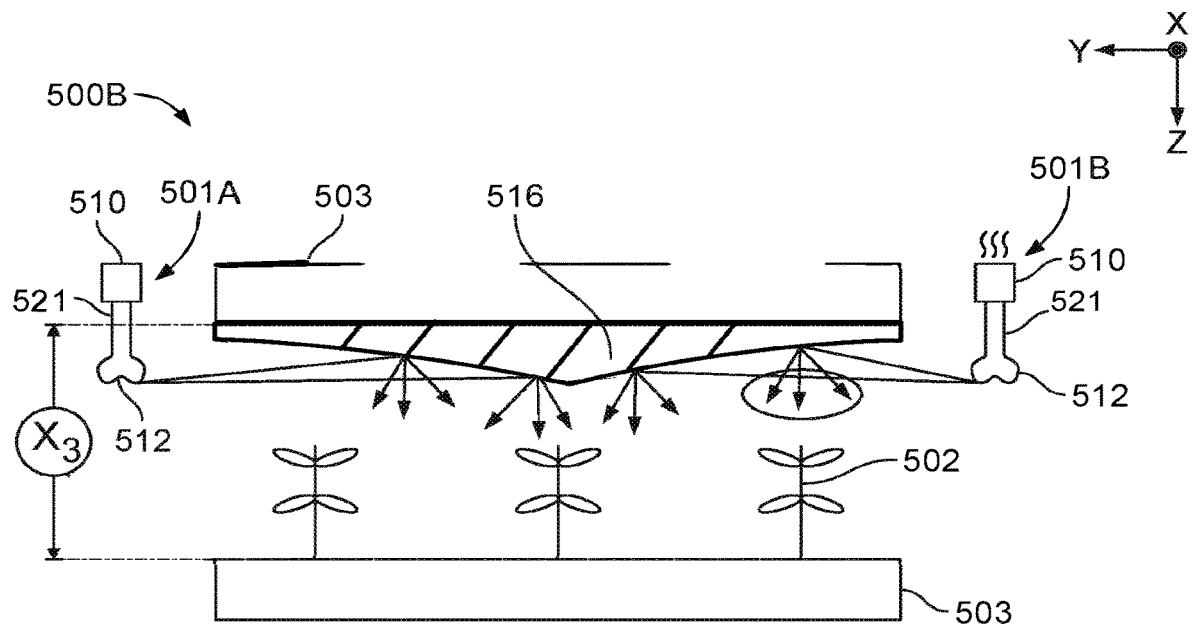
FIG. 5B is a second embodiment of the disclosed technologies with a plurality of side firing optical extractors and redirection features above the plant canopy.

FIG. 5B shows a side view of a lighting system 500B according to another embodiment of the present technology with a side-emitting, light guide luminaire module 501A located on the left and arranged to emit light to the right towards reflector 516 and another side-emitting, light guide luminaire module 501B located on the right and arranged to emit light to the left towards reflector 516 above the plant canopy. Examples of respective light guide luminaire modules 501A, 501B and reflectors 516 are described below in connection with FIGS. 7B and 17A-17B, for instance.

Figure 5C:
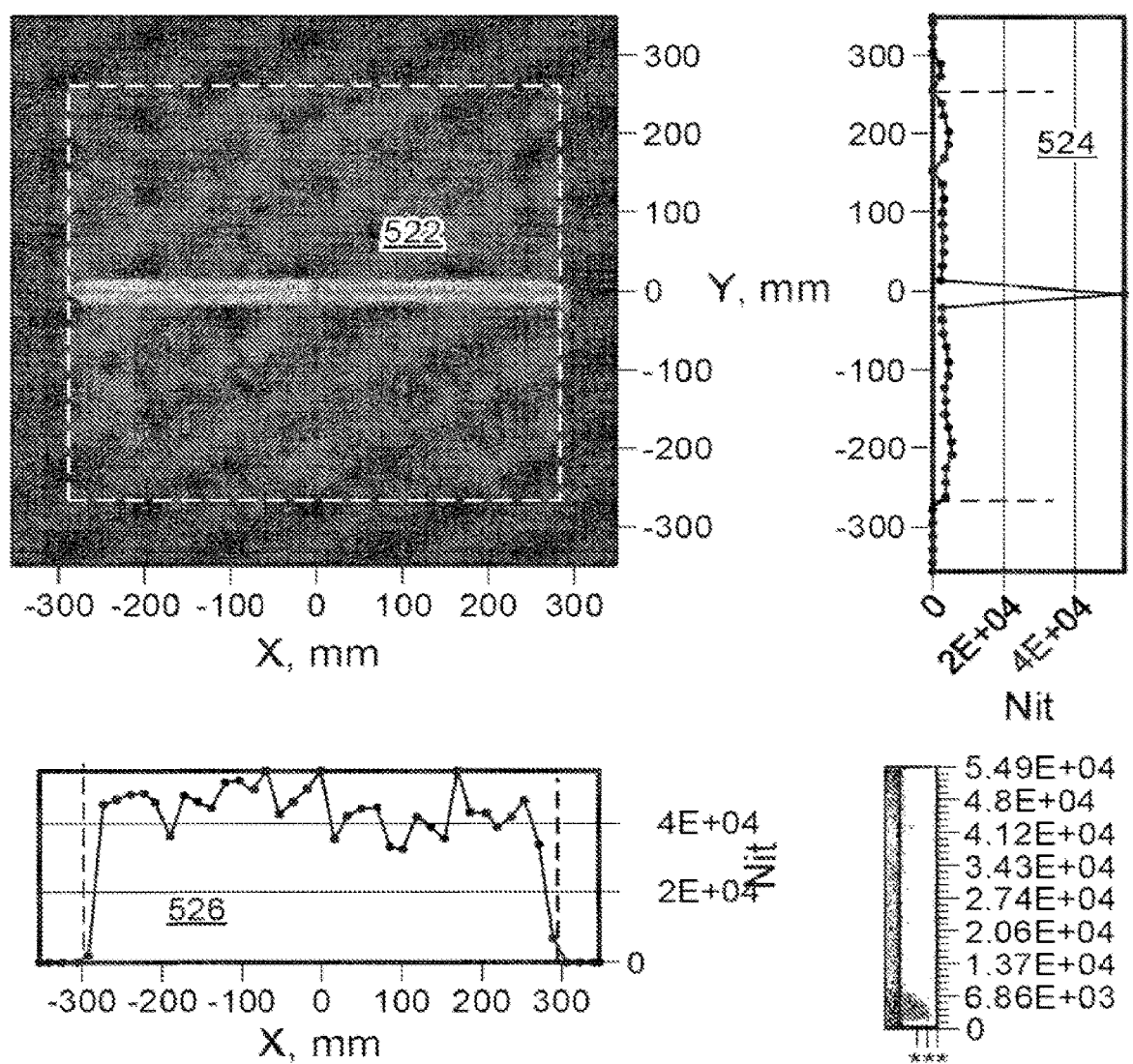
FIG. 5C shows a luminance plot associated with the first embodiment of the disclosed technologies.

FIG. 5C shows a luminance (x,y)-contour plot 522 measured looking upward, as "seen" by the plants 502 along the z-axis, at light reflected towards the plants by reflectors 515 of the lighting system 500. The dotted-line rectangle overlaid onto the luminance (x,y)-contour plot 522 indicates a footprint of reflectors 515 of the lighting system 500, for a light guide luminaire module 501 disposed between a pair of reflectors. FIG. 5C also shows a y-axis cross-section 524 that represents first variation of the luminance of the lighting system 500 across a first reflector 515, the bottom of the extractor 512 of the light guide luminaire module 501 and the second reflector 515 of the lighting system. The dotted lines overlaid onto the y-axis cross-section 524 indicate edges of the reflectors 515 of the illumination system 500. Additionally, FIG. 5C shows an x-axis cross-section 526 that represents second variation of the luminance of the illumination system 500 along the bottom of the extractor 512 of the light guide luminaire module 501 of illumination system 500. The dotted lines overlaid onto the x-axis cross-section 526 indicate edges of the reflectors 515 of the illumination system 500.

The results summarized in plots 522, 524 and 526 of FIG. 5C indicate that the choice of shapes and relative orientations of the redirecting surfaces and the backward output surfaces of the optical extractor 512 and of the reflective surface of the reflectors 515 that was made for designing the illumination system 500 led to a ratio of maximum luminance to minimum luminance across each of the reflectors 515 that is lower than 3:1. In this manner, each of the reflectors 515 appears to be uniformly lit, free of dark regions and/or hot spots, when "viewed" by the plants 502 from directly underneath the optical extractor 512.

Additionally, the results summarized in plots 522, 524 and 526 of FIG. 5C further indicate that (i) the choice of diffusive coatings applied on the transmissive backward output surfaces of the optical extractor 512 of the light guide luminaire module 501 and reflective surface of the reflectors 515—which influences, at least in part, a total amount of indirect light visible by the plants 502 underneath the illumination system 500—and (ii) the other choice of diffusive coatings applied on the transmissive forward output surfaces of the optical extractor 512—which influences, at least in part, a total amount of direct light visible by the plants 502 underneath the illumination system—that were made for designing the illumination system led to another ratio of maximum luminance to minimum luminance across each of the reflectors 515 and the bottom side of the optical extractor 512 that is lower than 15:1. These designs will be described below in detail, in connection with FIGS. 14A-14F and 15.

Figure 6A:
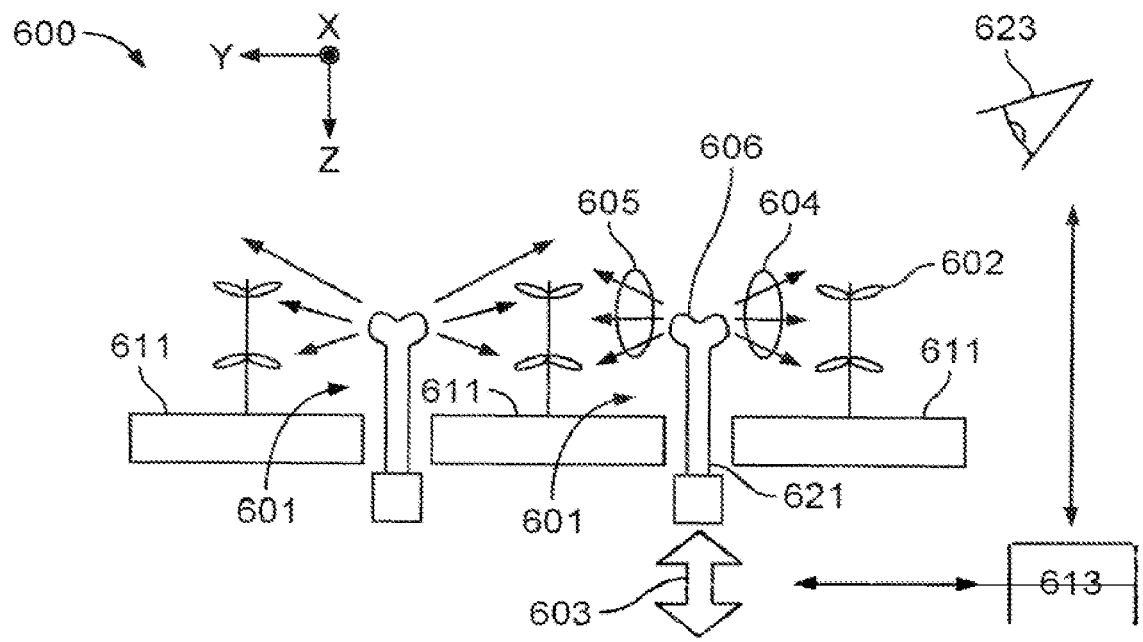
FIG. 6A is a third embodiment of the disclosed technologies with embedded vertical waveguides and extractors penetrating below the growth trays.
Figure 6B:
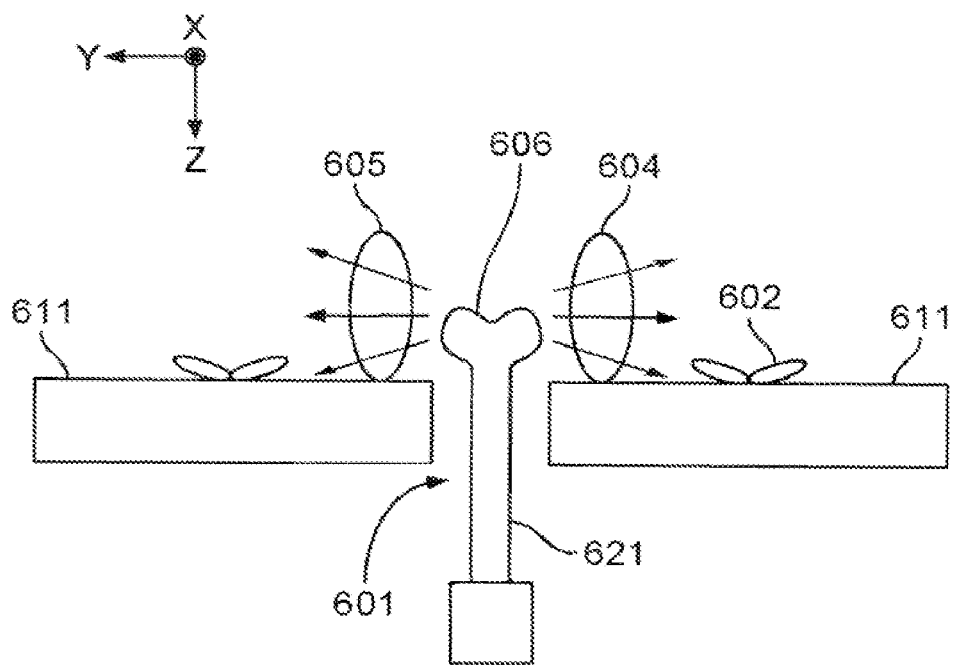
FIG. 6B shows how the third embodiment of the disclosed technologies is configured to support newly germinated plants.
Figure 6C:
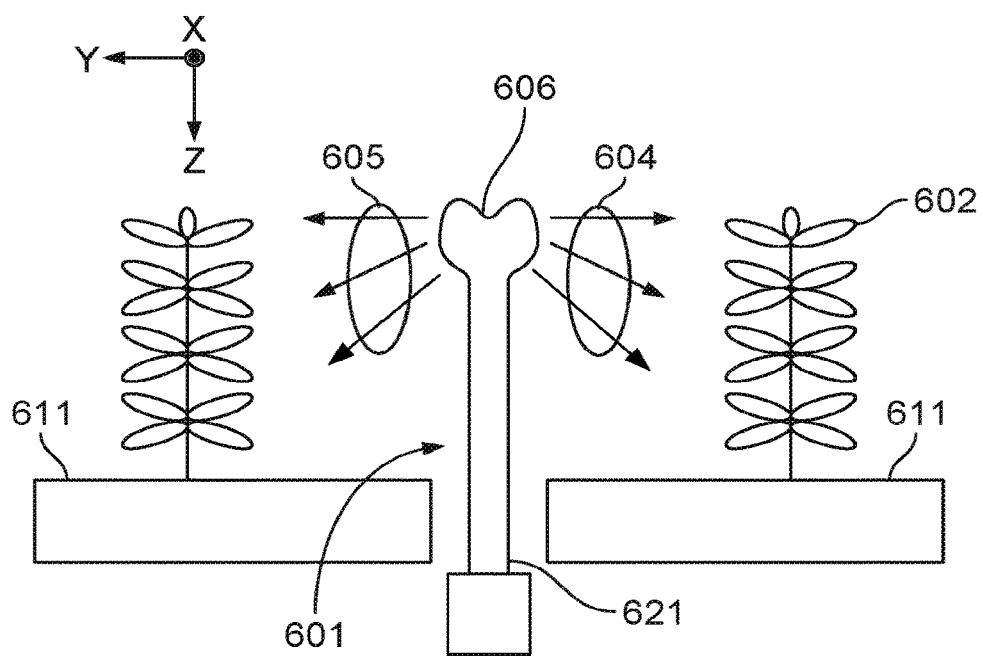
FIG. 6C shows how the third embodiment of the disclosed technologies can be configured to support mature plants.

FIG. 6A shows a side view, e.g., in the (y,z) plane, of a plant growth lighting system 600, in short referred to as lighting system, according to another embodiment of the present technology including height-adjustable or otherwise movable (indicated by shifting mechanism 603) light guide luminaire modules 601 configured to slide below a growth tray 611 (also referred to as a plant support) and configured to emit light 604, 605 from an extractor 606 sideways for direct illumination of plants 602. The extractor 606 is optically coupled with light guide 620. FIG. 6B schematically illustrates how a light guide luminaire module 601 can be recessed in a lower configuration to provide light close to the growth tray 611 for newly germinated plants 602. FIG. 6C schematically illustrates how a light guide luminaire module 601 can be raised to provide light for mature plants 602. The plant growth lighting system 600 can optionally include a sensor system 613 configured to monitor growth of the plants that is operatively coupled with a control system 623 that is configured to control the translation of one or more of the light guide luminaire modules 601 via the shifting system 603. Such control may be fully automated to follow the plant growth in a predetermined manner.

Figure 6D:
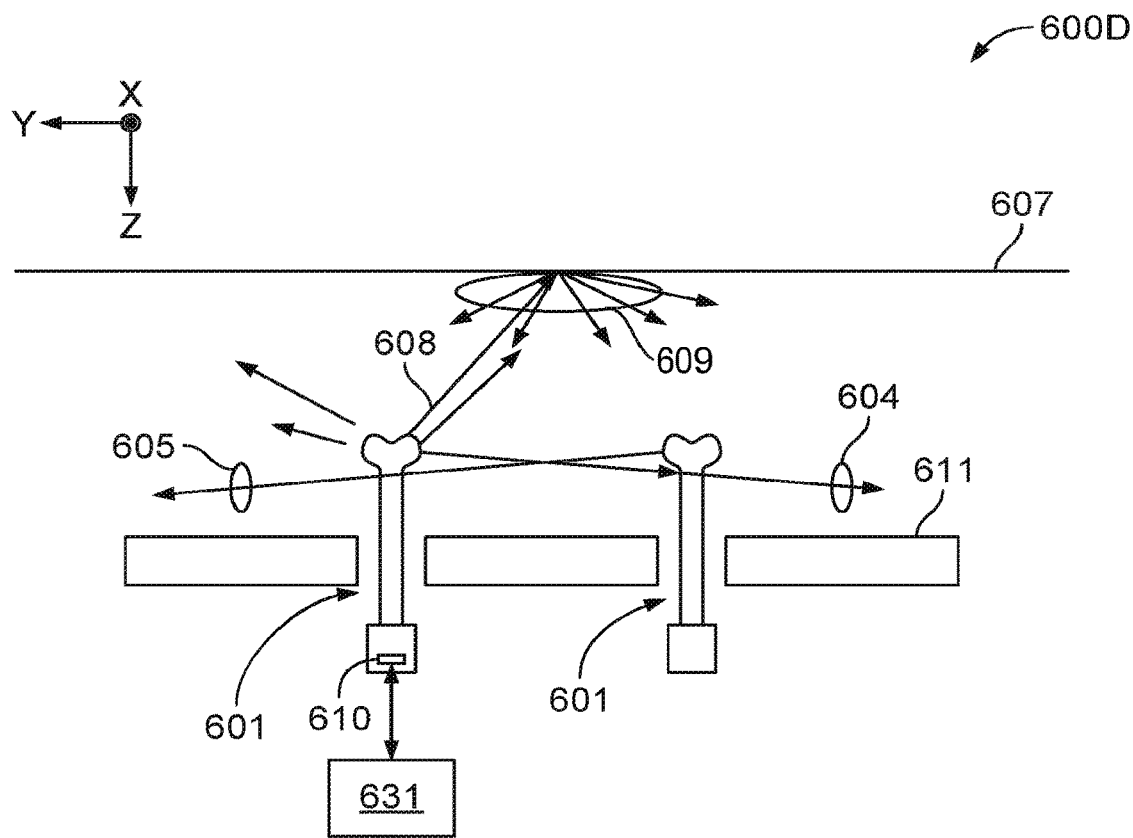
FIG. 6D shows a fourth embodiment of the disclosed technologies that shows how the disclosed technologies are configured to provide indirect and direct light from within the plant environment.

FIG. 6D schematically illustrates a lighting system 600D according to another embodiment of the present technology. In lighting system 600D, the luminaire modules 601 are configured to provide light 608 to a reflector 607 for indirect lighting 609 in addition to providing light 604, 605 directly to plants. Each of the luminaire modules 601 includes one or more LEEs 610. A single luminaire module 601 can include multiple LEEs 610 configured to generate light of like or different spectral power density distributions (SPDs). The lighting system 600D includes a control system 631 operatively coupled with and configured to control the LEEs 610 in the luminaire modules 601 during operation. Depending on the implementation, the lighting system 600D may be configured to allow control of the amount of the light, the SPD of the light output per luminaire module or across different luminaire modules, or combinations thereof via the control system 631.

Examples of respective light guide luminaire modules 601 are described below in connection with FIGS. 7A-7B, 8 and 9A-9B.

In general, the light intensity distribution provided by light guide module 601 reflects the symmetry of the light guide luminaire module's structure about the y-z plane. For example, referring to FIG. 6E, light 605 output in a first backward angular range corresponds to the first output lobe 145a of the far-field light intensity distribution 690, light 604 output in second backward angular range corresponds to the second output lobe 145b of the far-field light intensity distribution 690 and light 608 output (leaked) in third forward angular range corresponds to the third output lobe 145c of the far-field light intensity distribution 690. In general, an intensity profile of light guide luminaire module 601 will depend on the configuration of an optical coupler, the light guide 620 and the optical extractor 606. For instance, the interplay between the shape of the optical coupler, the shape of a redirecting surface of the optical extractor 606 and the shapes of the output surfaces of the optical extractor can be used to control the angular width and prevalent direction (orientation) of the output first 145a and second 145b lobes in the far-field light intensity profile 690. Additionally, a ratio of an amount of light in the combination of first 145a and second 145b output lobes and light in the third output lobe 145c is controlled by reflectivity and transmissivity of the redirecting surfaces of the optical extractor 606. For example, for a reflectivity of 90% and transmissivity of 10% of the redirecting surfaces, 45% of light can be output in the first backward angular range corresponding to the first output lobe 145a, 45% light can be output in the second backward angular range 145" corresponding to the second output lobe 145b, and 10% of light can be output in the third forward angular range corresponding to the third output lobe 145c.

It is noted that luminaire modules 501, 601 as noted above may be configured as elongate edge-coupled edge-emitting elements. Such elements can be made substantially as narrow as the employed LEEs and also use a transport light guide that is transparent. Also, the noted luminaire modules have light sources (e.g., LEEs) disposed remote from the light-emitting extractor thereby displacing the heat producing light sources in a better location remote from temperature sensitive plants and thereby aid in thermal management of the whole plant growth system.

Because the light guides 521, 621 are transparent, light can flow through the luminaire modules 501, 601, so they do not shadow light from adjacent light sources.

Plant shadowing of natural daylight in greenhouses by conventional electric lighting fixtures is noted as a problem in the current state of the art. Designs for light guide-based lighting fixtures of lighting systems 500, 500B, 600, 600D can be placed such that they minimize the shadowing effect because light can transmit through more than 60 to 70% of the light fixture.

The light guide luminaire modules 501, 601 can be placed through the growth trays 503, 611 and translated vertically to provide the optimal light for the various growth stages.

Small enough light guide luminaire modules 501, 601 can be placed much closer to the plants 502, 602 and yet provide very uniform illumination since it is not as impacted by inverse square law.

Under leaf lighting becomes possible as the light guide luminaire modules 501, 601 can be situated below the plants 502, 602 and radiate upwards towards the leaves. As the plant grows 502, 602, it is also possible to extend or retract the light guide luminaire modules 501, 601 so that the light is placed in the most optimal position.

If the light guide luminaire modules 501, 601 are placed at the side of the growth trays 503, 611, they can send sheets of light out across the bottom of the growth trays above the plants 502, 602 where it can be reflected in a prescribed pattern of uniform illumination to the plants below.

Light guide luminaire modules 501, 601 can be designed to be very small and even designed to become part of the growth environment infrastructure such as trays, holders and fluid delivery systems so that they are in closer proximity to the plants 502, 602.

Spectral content of the upward light vs the downward light components can be modified via adjacent extraction systems with different spectral content LEDs. Thus the underleaf light spectral mix (due to light 604, 605) can be different from the over leaf spectral mix (due to light 609), thereby fine-tuning the lighting to the plant's needs.

The bottom of the upper growth tray 503, 611 becomes part of the prescribed reflecting surface above the target growth tray.

The highly asymmetric lighting distribution from light guide luminaire modules 501, 601 on either side of the growth tray 503, 611 is matched to a surface profile of the tray which provides for uniform diffuse illumination from above.

The light guide luminaire modules 501, 601 are placed on either one or both sides of the growth plane and can be moved up/down depending upon crop and lifecycle.

The light guide luminaire modules 501, 601, on one or both sides, can have their LEE cooling and heat removal advantageously conveyed by having the lighting system 500, 500B, 600, 600D include the fluid flow for nutrients within the housing. As water and nutrients flow through the conduit, heat can be coupled directly and will warm the fluid, which can either be harnessed for other purposes, in a heat exchanger, or exhausted, to manage the working air temperature of the enclosure.

By combining electronic spatial tuning with light guides that have a plurality of light distributions that can be electronically selected, it is possible to modify the light distribution during the maturation of the plant 502, 602. By combining this feature with spectral tuning and mixing, the plant 502, 602 is able to go through an efficient process of absorption and relaxation that may stimulate increased growth.

Mixing and modulating the light of different spectral capabilities in the system 500, 500B, 600, 600D can be done at high frequencies, which may increase the productive efficiency of certain desirable plant characteristics.

Using the disclosed systems 500, 500B, 600, 600D with feedback techniques, such as chemical analysis, (hyper) spectral analysis and other measurements of plant growth dynamics, by both direct and indirect means, the systems 500, 500B, 600, 600D can be electronically and/or mechanically adapted to increase the productivity of the plant growth environment.

The use of multi-lobed light distributions (e.g., 690), offers the opportunity to modulate the balance between direct and indirect lighting for the plant canopy. As in nature, the combinations of light received by plants 502, 602 consists of many different spectral and spatial components that vary throughout the day. This electro-optical system is capable of emulating the important properties of natural daylighting, or even improving upon natural sources of light and its respective components effective in growth and maturation of plant materials. This can fine-tune the plant properties, which are noted in research as being highly plastic to changes in light content/direction/duration recipes.

The use of light guide luminaire modules 501, 601 in lighting systems 500, 500B, 600, 600D as described herein can help mitigate the impact of fixture "shadowing" on plants 502, 602 grown in greenhouses where artificial lighting is provided with traditional fixtures. The light guide transparency and compact emitting surfaces may be useful in this respect. Moreover, plant illumination is not necessarily concerned with glare, which is an important aspect in the lighting of human occupied spaces. Additionally, diffuse-transmitting greenhouse windows and/or panels may be used to spread sunlight or artificial light and provide Lambertian-emitting surfaces.

Examples of light guide luminaire modules 601 used in lighting systems 600, 600D are described next.

Figure 7A:
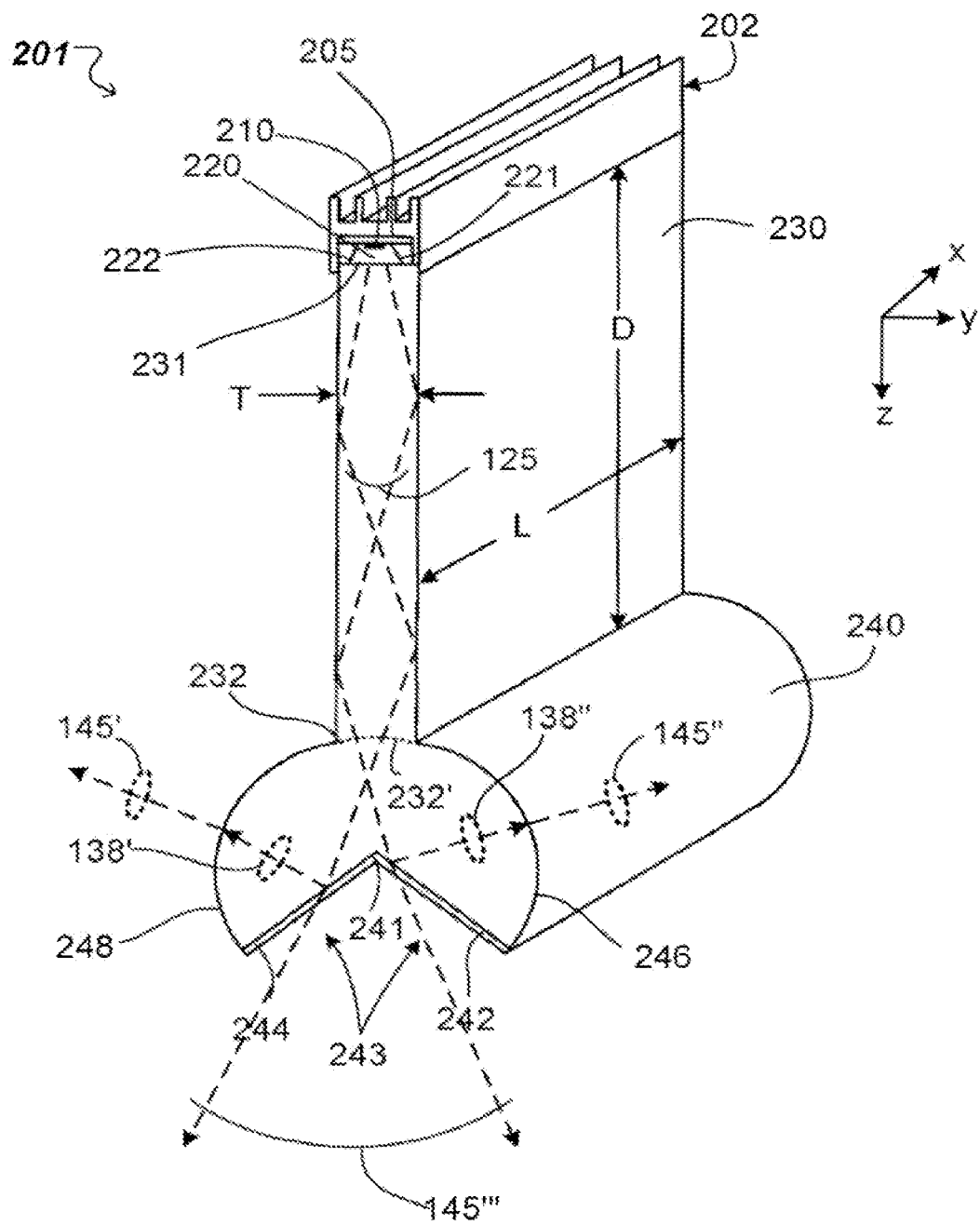
FIGS. 7A-7B show aspects of light guide luminaire modules.

Referring to FIG. 7A, a light guide luminaire module 201 (or simply a light guide module) includes a substrate 205 having a plurality of LEEs 210 distributed along a first surface of the substrate 205. The mount with the LEEs 210 is disposed at a first (e.g., upper) edge 231 of a light guide 230. Once again, the positive z-direction is referred to as the "forward" direction and the negative z-direction is the "backward" direction. Sections through the light guide module 201 parallel to the x-z plane are referred to as the "cross-section" or "cross-sectional plane" of the light guide module. Also, light guide module 201 extends along the y-direction, so this direction is referred to as the "longitudinal" direction of the light guide module. Implementations of light guide modules can have a plane of symmetry parallel to the y-z plane, and can be curved or otherwise shaped. This is referred to as the "symmetry plane" of the light guide module.

Multiple LEEs 210 are disposed on the first surface of the substrate 205, although only one of the multiple LEEs 210 is shown in FIG. 7A. For example, the plurality of LEEs 210 can include multiple white LEDs. The LEEs 210 are optically coupled with one or more optical couplers 220 (only one of which is shown in FIG. 7A). An optical extractor 240 is disposed at second (e.g., lower) edge 232 of light guide 230.

Substrate 205, light guide 230, and optical extractor 240 extend a length L along the y-direction, so that the light guide module is an elongated light guide module with an elongation of L that may be about parallel to a display panel. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the substrate 205 will generally depend, inter alia, on the length L, where more LEEs are used for longer light guide modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the light guide module. For example, a relatively high density of LEEs can be used in applications where high illuminance is desired or where low power LEEs are used. In some implementations, the light guide module 201 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the light guide module. In some implementations, the substrate 205 can be attached to a housing 202 configured as a heat-sink to extract heat emitted by the plurality of LEEs 210. A surface of the substrate 205 that contacts the housing 202 opposes the side of the substrate 205 on which the LEEs 210 are disposed. The light guide module 201 can include one or multiple types of LEEs, for example one or more subsets of LEEs in which each subset can have different color or color temperature.

Optical coupler 220 includes one or more solid pieces of transparent optical material (e.g., a glass material or a transparent plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of light guide module 201. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 125) reflects off the planar surfaces of the light guide by TIR and spatially mixes within the light guide. The mixing can help achieve illuminance and/or color uniformity, along the x-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent optical material (e.g., a glass material or a transparent plastic, such as polycarbonate or acrylic) that can be the same as or different from the material forming light guide 230. In the example implementation shown in FIG.

7A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the light guide module 201.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 125 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in a third forward angular range 145'''. In some cases, the light transmitted in the third forward angular range 145''' is refracted. In this way, the redirecting surface 243 acts as a beam splitter rather than a mirror, and transmits in the third forward angular range 145''' a desired portion of incident light, while reflecting the remaining light in angular ranges 138'' and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 7A, the output surfaces 246, 248 of the optical extractor 240 are curved with a constant radius of curvature that is the same for both. In an aspect, the output surfaces 246, 248 may have optical power (e.g., may focus or defocus light.) Accordingly, light guide module 201 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the light guide module 201 corresponds to the emission spectrum of the LEEs 210. However, in some implementations, a wavelength-conversion material may be positioned in the light guide module, for example remote from the LEEs, so that the wavelength spectrum of the light guide module is dependent both on the emission spectrum of the LEEs and the composition of the wavelength-conversion material. In general, a wavelength-conversion material can be placed in a variety of different locations in light guide module 201. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n2)(-\frac{1}{2})$, where R is the radius of curvature of the light-exit surfaces (246 and 248 in FIG. 7A) of the extractor 240 and n is the index of refraction of the portion of the extractor that is opposite of the wavelength-conversion material as viewed from the reflective surfaces (242 and 244 in FIG. 7A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the light guide module. The first portion of the redirecting surface 242 provides light having an angular distribution 138 towards the output surface 246, the second portion of the redirecting surface 244 provides light having an angular distribution 138' towards the output surface 248. The light exits optical extractor 240 through output surfaces 246 and 248. In general, the output surfaces 246 and 248 have optical power, to redirect the light exiting the optical extractor 240 in first and second backward angular ranges 145', 145'', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the light guide module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the light guide module 201 is attached to a ceiling of a room (e.g., the forward direction is towards the floor) such configurations can help avoid glare and an appearance of non-uniform illuminance.

In general, the light intensity distribution provided by light guide module 201 reflects the symmetry of the light guide module's structure about the y-z plane, as described above in connection with FIG. 6E. Referring to both FIGS. 6E and 7A, the orientation of the output lobes 145a, 145b can be adjusted based on the included angle of the v-shaped groove 241 formed by the portions of the redirecting surface 242 and 244. For example, a first included angle results in a far-field light intensity distribution 690 with output lobes 145a, 145b located at relatively smaller angles compared to output lobes 145a, 145b of the far-field light intensity distribution 690 that results for a second included angle larger than the first angle. In this manner, light can be extracted from the light guide module 201 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 125 of the light that is received at the input end of the optical extractor 232', concave reflective surfaces 242, 244 can narrow the lobes 145a, 145b output by the optical extractor 240 (and illustrated in FIG. 6E), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

Figure 6E:
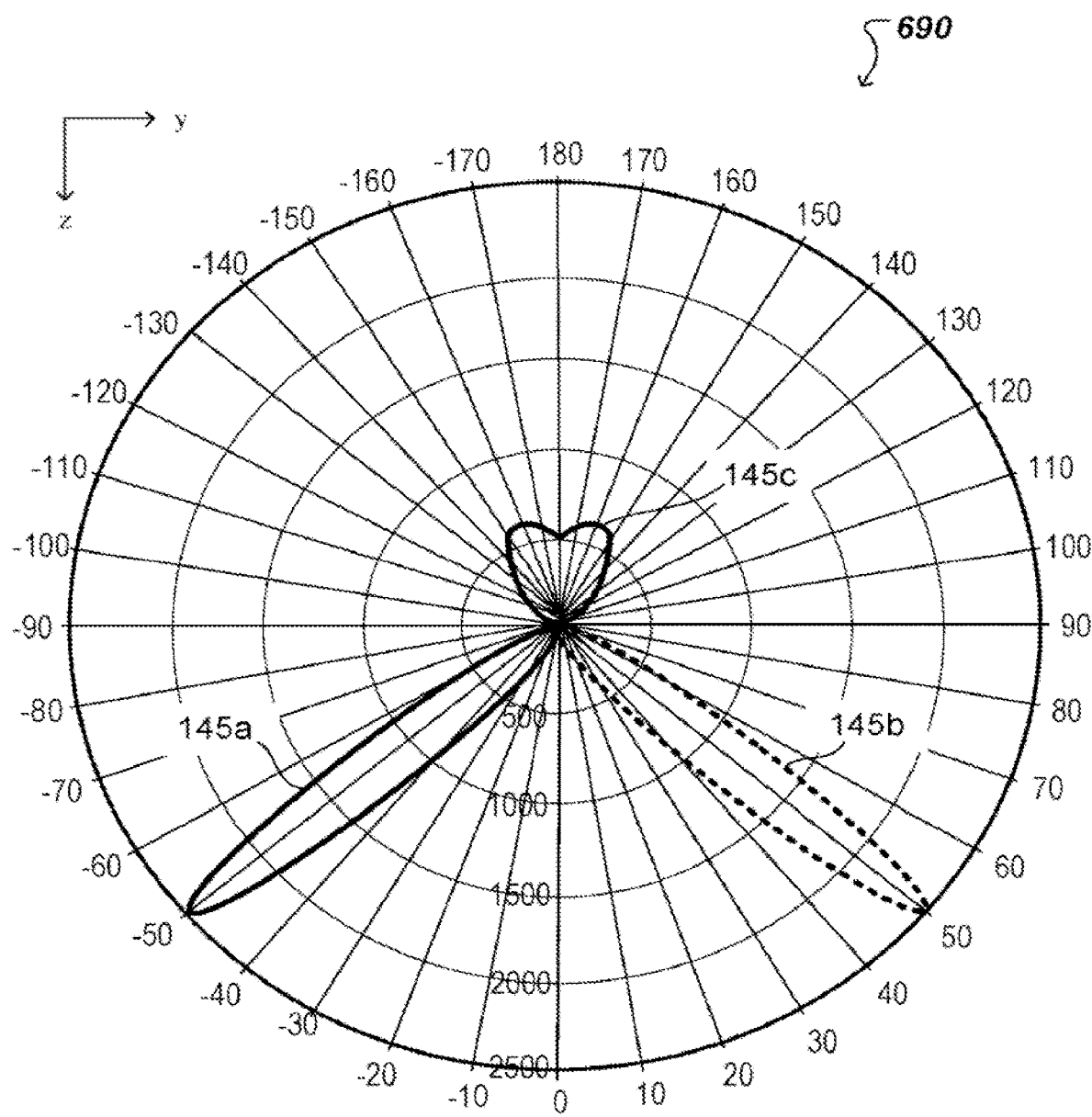
FIG. 6E shows a light intensity plot associate with the third and fourth embodiments of the disclosed technologies.

In general, light guide module 201 can be designed to output light into different first and second backward angular ranges 145', 145" from those shown in FIG. 7A. In some implementations, illumination devices can output light into lobes 145a, 145b that have a different divergence or propagation direction than those shown in FIG. 6E. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 6E. The "direction" refers to the direction at which a lobe is brightest. In FIG. 6E, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The light guide modules can include other features useful for tailoring the intensity profile. For example, in some implementations, light guide modules can include an optically diffuse material that can diffuse light in a controlled manner to aid homogenizing the light guide module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on the surface of the circular structure and has an angle of incidence less than the critical angle and will exit the circular structure without experiencing TIR. Light rays propagating within the spherical structure in the plane but not emanating from within the notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than R/(1+n2)(−½), which is smaller than R/n, will be subject to small Fresnel reflection at the surface of radius R when exiting the circular structure. This condition may be referred to as Brewster geometry. Implementations may be configured accordingly.

Referring again to FIG. 7A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

Figure 7B:
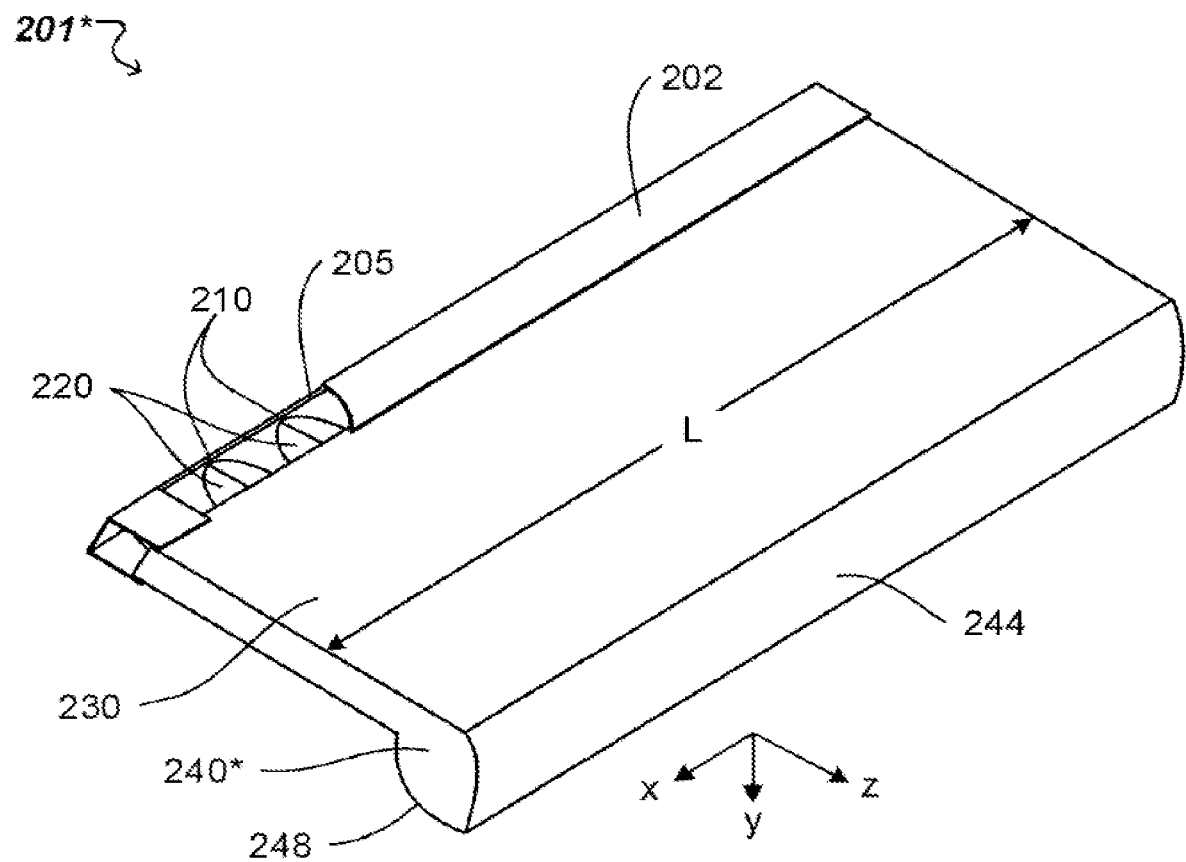

In the example implementations described above in connection with FIG. 7A, the light guide module 201 is configured to output light into first and second backward angular ranges 145' and 145" and in third forward angular range 145'''. In other implementations, the light guide-based light guide module 201 is modified to output light into a single backward angular range 145'. FIG. 7B shows such light guide-based light guide module 201* configured to output light on a single side of the light guide is referred to as a single-sided light guide module. The single-sided light guide module 201* is elongated along the x-axis like the light guide module 201 shown in FIG. 7A. Also like the light guide module 201, the single-sided light guide module 201* includes a substrate 205 and LEEs 210 disposed on a surface of the substrate 205 along the x-axis to emit light in a first angular range. The single-sided light guide module 201* further includes optical couplers 220 arranged and configured to redirect the light emitted by the LEEs 210 in the first angular range into a second angular range 125 that has a divergence smaller than the divergence of the first angular range at least in the x-z cross-section. Also, the single-sided light guide module 201* includes a light guide 230 to guide the light redirected by the optical couplers 220 in the second angular range 125 from a first end 231 of the light guide to a second end 232 of the light guide. Additionally, the single-sided light guide module 201* includes a single-sided extractor (denoted 240*) to receive the light guided by the light guide 230. The single-sided extractor 240* includes a redirecting surface 244 to redirect some of the light received from the light guide 230 into a third angular range 138', like described for light guide module 201 with reference to FIG. 7A, and an output surface 248 to output the light redirected by the redirecting surface 244 in the third angular range 138' into a first backward angular range 145'. Also as described in FIG. 7A, the redirecting surface 244 is configured to leak some the light received from the light guide 230 into a third forward angular range 145'''.

A light intensity profile of the single-sided light guide module 201* is represented in FIG. 6E as the first output lobe 145a and the third output lobe 145c. The output lobe 145a corresponds to light output by the single-sided light guide module 201* in the first backward angular range 145' and the output lobe 145c corresponds to light output by the single-sided light guide module 201* in the third forward angular range 145''.

In general, light guide modules like the light guide module 201* can be combined with a single tertiary reflector to provide (i) indirect illumination to a first portion of a target surface from light output by the light guide module in the first backward angular range 145' and redirected by the tertiary reflector to a first forward angular range 155', and (ii) direct illumination to a second, different portion of the target surface from light output by the light guide module in the third forward angular range 145''. Further, light guide modules like the light guide module 201* can be combined with a pair of tertiary reflectors to provide, as shown, e.g., in FIG. 1, (i) indirect illumination to first and second different portions of a target surface from light output by the light guide module in the respective first and second backward angular ranges 145', 145'' and respectively redirected by the tertiary reflectors to first and second forward angular ranges 155', 155'', and (ii) direct illumination to a third portion of the target surface, different from the first and second portions, from light output by the light guide module in the third forward angular range 145''. An example of the latter combination is described below.

Figure 8:
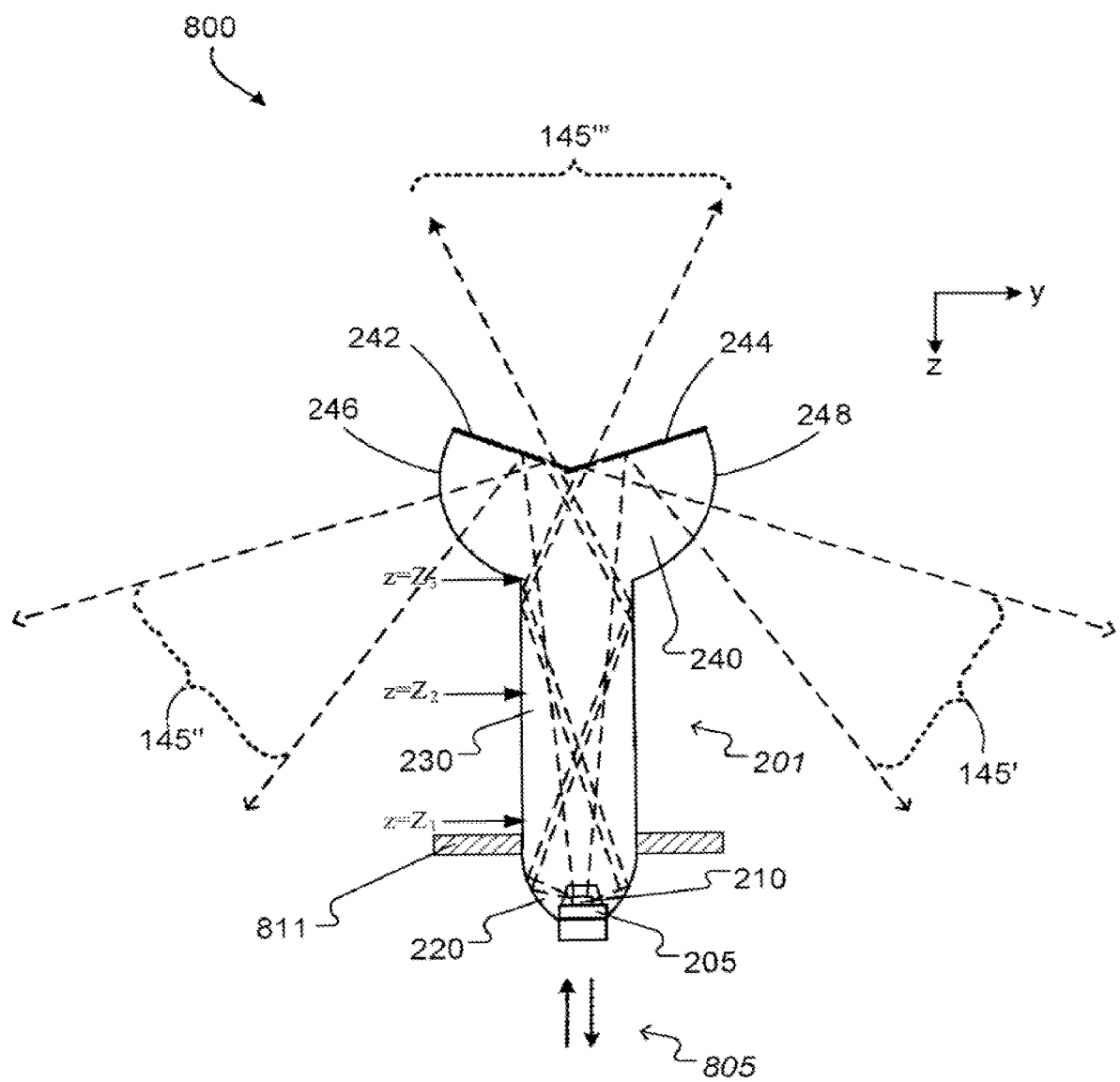
FIG. 8 shows aspects of an adjustable illumination device that includes a light guide luminaire module and a sliding mechanism.

The light guide module 201 or 201* can be used in an upright configuration where the LEEs are positioned underneath the optical extractor 240. FIG. 8 shows a cross-section of an adjustable illumination device 800 that can be implemented in lighting system 600, 600D, for instance. In this example, the adjustable illumination device 800 includes an embodiment of a light guide luminaire module, such as light guide luminaire module 201 described above in connection with FIG. 7A, and a sliding mechanism 805 (the latter represented by two anti-parallel arrows). Further in this example, a position of the light guide luminaire module 201 can be adjusted by the sliding mechanism 805 relative to a housing 811 to which the light guide luminaire module is coupled.

As described above in connection with FIG. 7A, the light guide luminaire module 201 can output light in backward angular ranges 145' and 145''. In this example, the light output in backward angular ranges 145' and 145'' illuminates a target space (e.g., a tray 611 that support plants 602 in lighting systems 600, 600D, for instance). In some implementations, the light guide luminaire module 201 is configured to also output light in forward angular range 145''', as described above in connection with FIG. 7A. In this example, the light output in forward angular range 145'' illuminates a remote space (e.g., the reflector 607 lighting system 600D.)

As described herein, the light guide luminaire module 201 includes a substrate 205 and multiple LEEs 210. The LEEs 210 can be coupled with the substrate 205. The light guide luminaire module 201 includes optical couplers 220 corresponding to the LEEs 210, the light guide 230, and the optical extractor 240. A portion of the light that is guided by the light guide 230 in a collimated angular range to the optical extractor 240 is redirected by a first portion 242 of a redirecting surface and then output from the optical extractor 240 through a first output surface 246.

Another portion of the light received at the optical extractor 240 in the collimated angular range is redirected by a second portion 244 of the redirecting surface and then output from the optical extractor 240 through a second output surface 248. A mounting frame and attachment brackets can be used to position/attach the optical couplers inside the housing 811 to couple the light guide luminaire module 201 to the sliding mechanism 805.

Figure 9A:
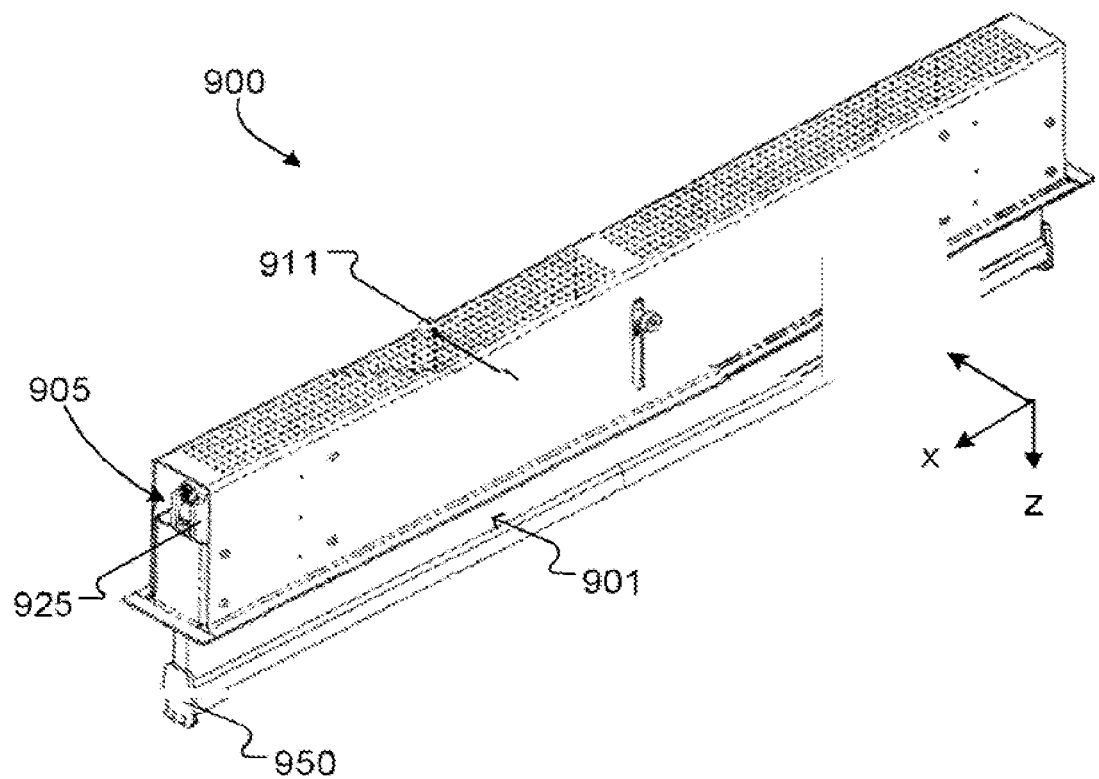
FIGS. 9A-9B show aspects of an embodiment of the sliding mechanism of the adjustable illumination device of FIG. 8.
Figure 9B:
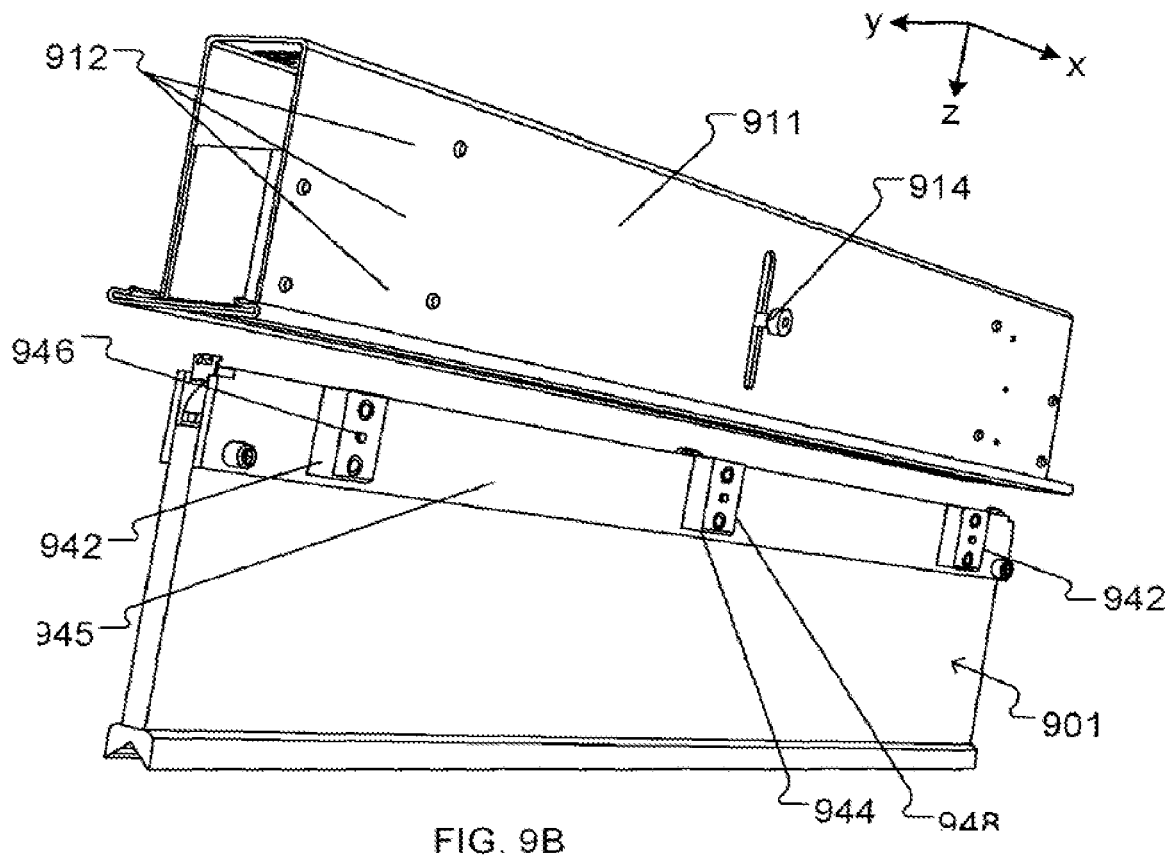

In general, the mounting structure that allows for adjustment of the position of the luminaire module relative to the ceiling (or other background area) can be configured in different ways. An example of a mounting structure for an elongate luminaire module is shown in FIGS. 9A-9B. Here, an adjustable illumination device 900 includes a housing 911 that allows for mounting the adjustable illumination device to a ceiling. The adjustable illumination device 900 includes a luminaire module 901 (e.g., having a structure similar to luminaire module 201), the housing 911, and a sliding mechanism 905 for adjusting an extension of the luminaire module 901 relative to the housing 911. The luminaire module 901 can be moved relative to the housing 911 (e.g., the luminaire module can be slid back and forth in the housing to extend or retract the luminaire module.) In some implementations, one or more tools 950 can be used to push/pull the luminaire module 901 into and out of the housing 911. The one or more tools 950 can be permanently or removably coupled with the luminaire module at one or more locations. For example, such tools can be arranged at opposite ends with respect to the length of the light guide and/or in the center of the light guide proximate the optical extractor. The tool can comprise a tab handle, hook, a spring, or alike. One end of the housing 911 includes a flange that sits flush with the ceiling when the adjustable illumination device is installed in a room. This end includes an opening into which the luminaire module is inserted.

The sliding mechanism 905 includes guide rails 925, guide blocks 942 and 944, spring loaded bolts 946 and openings 912. The openings 912 are configured to allow partial mating with respective spring loaded bolts 946. The spring loaded bolts 946 can have rounded ends for protruding beyond a face of the respective guide blocks 942. The guide block 944 can have an opening 948 that can be configured to receive a screw 914 for securing the luminaire module 901 and limiting its translational movement relative to the housing 911.

The sliding mechanism can be configured such that the spring loaded bolts 946 resiliently engage with the openings 912 when the luminaire module 901 is inserted in the housing 911. Release from the resilient engagement can be achieved by exerting a minimum pull/push force between the luminaire module 901 and the housing 911. Force can be exerted via the removable tool 950, by an electric motor, or any other means suitable to traverse the luminaire module 901.

The guide rails 925 can be located between the guide blocks 942 when the luminaire module 901 is inserted in the housing 911. The fit between the guide blocks 942 and the guide rails 925 can be configured to provide sufficient tolerances and allow for an amount of force imbalance between the removable tools 950 that are located on opposite ends of the luminaire module 901 to avoid jamming during up/down movement. In some implementations, the openings 912 can have a circular, an elongate (parallel to horizontal) or other shape to allow reproducible interlocking even when an offset between the spring loaded bolts 946 and the openings 912 occurs. The guide blocks 942 and 944 can be attached to a rail 945, which can be configured to hold and secure the upper edge of the luminaire module 901.

While in the present example the luminaire module is manually slid relative to the housing in discrete steps, other implementations are also possible. For example, in some embodiments, adjusting the luminaire module 901 (i.e., sliding the luminaire module into and out of the housing) can be performed using a mechanical or electromechanical or other actuator, for example. The actuator can be based on analog or digital control and configured to slide the luminaire module relative to the housing. Such actuators can be configured to allow for remote control of the position of the luminaire module 901. Example actuators can include leadscrews and stepper motors in which the stepper motor drives the leadscrew which then translates rotational movement into a linear movement. To mitigate seizing in long linear systems, multiple actuators and/or extended actuator mechanisms may be disposed along the length of the illumination device, which may be electrically or mechanically synchronized via suitable control signals or one or more synchronization belts, for example.

Furthermore, different luminaire modules can have different heights, i.e., the maximum (and minimum) extension relative to the housing 911 depends on the height of the respective luminaire module.

FIG. 10A is a contour plot of a simulated intensity distribution in a plane of the housing 811 that corresponds to the configuration of the adjustable illumination device 800 shown in FIG. 8 (i.e., full extension of the luminaire module, e.g., at $z=Z_1$) and the intensity profile shown in FIG. 6E. The x-axis of the plot shown in FIG. 10A refers to the illumination distribution in the longitudinal direction of the adjustable illumination device 800 (x-axis in FIG. 7A or 8) and the y-axis of the plot refers to the illumination distribution in the transverse direction of the adjustable illumination device 800 (y-axis in FIG. 7A or 8.) FIG. 10B is a cross section plot of the intensity distribution from FIG. 10A in the transverse direction (y-axis) of the adjustable illumination device 800 at x=0. The second axis of the plot shown in FIG. 10B refers to illuminance (lux) in the transverse direction of the adjustable illumination device 800. In this example, the illuminance between a distance of −1,000 and +1,000 mm from the adjustable illumination device in transverse direction reaches up to 3,500 lux. FIG. 10C is a cross section plot of the intensity distribution from FIG. 10A in the longitudinal direction (x-axis) of the adjustable illumination device 800 at y=0. The second axis of the plot shown in FIG. 10C refers to illuminance (lux) in the longitudinal direction of the adjustable illumination device 800. In this example, the illuminance between a distance of −400 and +400 mm from the adjustable illumination device along the longitudinal direction reaches up to 2,250 lux.

FIG. 11A is a contour plot of a simulated intensity distribution in a plane of the housing 811 that corresponds to the configuration of the adjustable illumination device 800 shown in FIG. 8 (i.e., partial extension of the luminaire module, e.g., at $z=Z_2$) and the intensity profile shown in FIG. 6E. The x-axis of the plot shown in FIG. 11A refers to the illumination distribution in the longitudinal direction of the adjustable illumination device 800 (x-axis in FIG. 7A or 8) and the y-axis of the plot refers to the illumination distribution in the transverse direction of the adjustable illumination device 800 (x-axis in FIG. 7A or 8). FIG. 11B is a cross section plot of a simulated intensity distribution in the transverse direction (y-axis) of the adjustable illumination device 800. The second axis of the plot shown in FIG. 11B refers to illuminance (lux) in the transverse direction of the adjustable illumination device 800. In this example, the illuminance between a distance of −900 and +900 mm from the adjustable illumination device in transverse direction reaches up to 4,750 lux. FIG. 11C is a cross section plot of a simulated intensity distribution in the longitudinal direction (x-axis) of the adjustable illumination device 800. The second axis of the plot shown in FIG. 11C refers to illuminance (lux) in the longitudinal direction of the adjustable illumination device 800. In this example, the illuminance between a distance of −375 and +375 mm from the adjustable illumination device along the longitudinal direction reaches up to 2,400 lux.

FIG. 12A is a contour plot of a simulated intensity distribution in a plane of the housing 811 that corresponds to the configuration of the adjustable illumination device 800 shown in FIG. 8 (i.e., full retraction of the luminaire module, e.g., at $z=Z_3$) and the intensity profile shown in FIG. 6E. The x-axis of the plot shown in FIG. 12A refers to the illumination distribution in the longitudinal direction of the adjustable illumination device 800 (x-axis in FIG. 7A or 8) and the y-axis of the plot refers to the illumination distribution in the transverse direction of the adjustable illumination device 800 (y-axis in FIG. 7A or 8.) FIG. 12B is a cross section plot of a simulated intensity distribution in the transverse direction (y-axis) of the adjustable illumination device 800. The second axis of the plot shown in FIG. 12B refers to illuminance (lux) in the transverse direction of the adjustable illumination device 800. In this example, the illuminance between a distance of −600 and +600 mm from the adjustable illumination device in transverse direction reaches up to 7,500 lux. FIG. 12C is a cross section plot of a simulated intensity distribution in the longitudinal direction (x-axis) of the adjustable illumination device 800. The second axis of the plot shown in FIG. 12C refers to illuminance (lux) in the longitudinal direction of the adjustable illumination device 800. In this example, the illuminance between a distance of −350 and +350 mm from the adjustable illumination device along the longitudinal direction reaches up to 2,500 lux.

FIGS. 10C, 11C, and 12C show that the illumination of the plane of the housing 811 remains substantially above 2000 lux along the elongate dimension of the adjustable illumination device 800 (i.e., the length of the adjustable illumination device 800 defined by the X coordinate) even though the extension of the luminaire module (i.e., the distance of the optical extractor 240 to the plane of the housing 811) varies. However, the illumination of the plane of the housing 811 along the Y coordinate varies dependent on the extension of the luminaire module. For example, as shown in FIG. 10B, the adjustable illumination device 800 with a fully extended luminaire module illuminates the plane of the housing 811 at above 500 lux to about 600 mm in the Y direction from the adjustable illumination device 800. In comparison, as shown in FIG. 12B, the adjustable illumination device 800 with a fully retracted luminaire module illuminates the plane of the housing 811 at above 500 lux to about 400 mm in the Y direction from the adjustable illumination device 800.

Examples of light guide luminaire modules 501, 501A, 501B and reflectors 515, 516 used in lighting systems 500, 500B are described next.

Figure 13A:
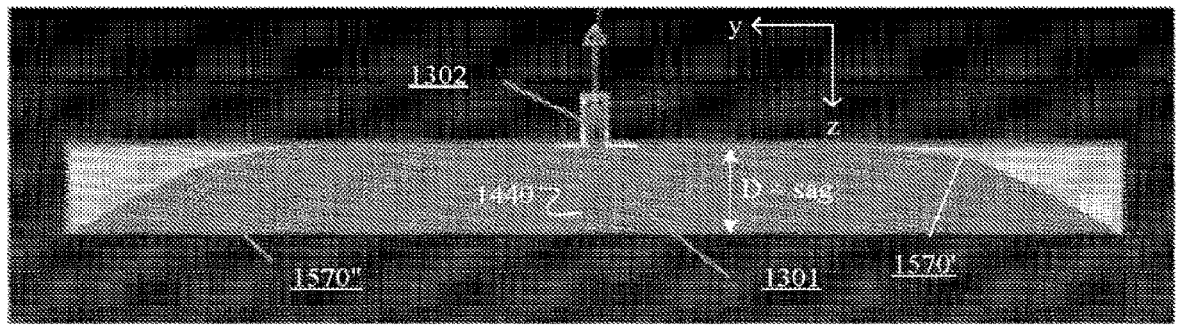
FIGS. 13A-13B show aspects of a configuration of the third embodiment of the disclosed technologies.
Figure 13B:
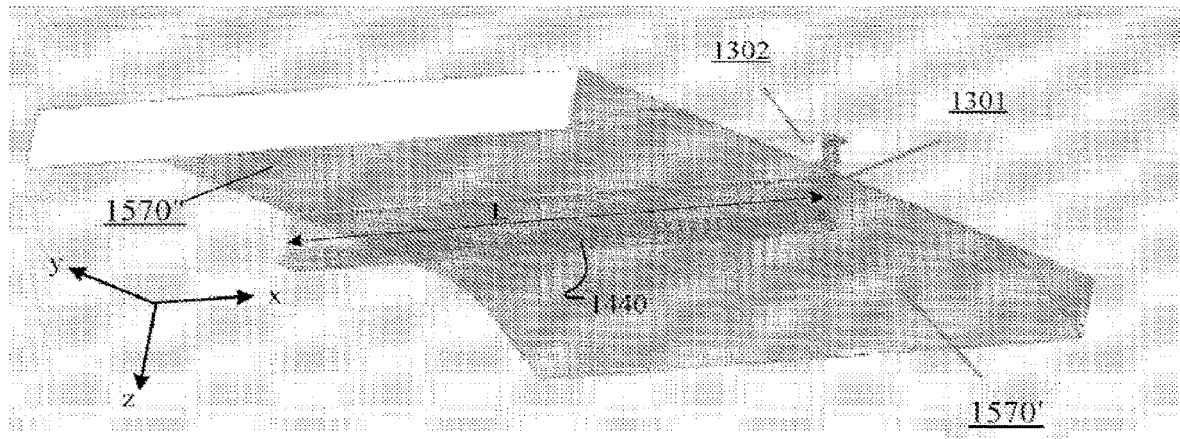

FIGS. 13A-13B show a side view and a perspective view, respectively, of an example lighting system 1300 including a light guide module 1301 and tertiary reflectors 1570', 1570". Lighting system 1300 can be used as the lighting system 500 described above, where the light guide module 1301 and the tertiary reflectors 1570', 1570" correspond to the light guide module 501 and reflector 515, respectively. Solid state light sources, optical couplers and a light guide of the light guide module 1301 can be implemented like the corresponding components of the light guide module 201 described above in connection with FIG. 7A. An optical extractor 1440 of the light guide module 1301 is mirror symmetric relative to the z-axis (which coincides with the optical axis of the light guide module 1301) and can be implemented as described below in connection with FIGS. 14A-14F. Respective "front faces" (referred to as reflective surfaces) of the tertiary reflectors 1570', 1570", that face the light guide module 1301, can be implemented as described below in connection with FIG. 15, while "rear faces" can be implemented as a solid block or can have other forms/shapes. Note that while the plurality of solid state light sources and the optical couplers of the light guide module 1301 are housed within a housing 1302, the light guide of light guide module protrudes from the housing to lower the optical extractor 1440 of light guide module by a distance D along the z-axis comparable to a sag of the tertiary reflectors 1570', 1570" in the (y,z) plane. The light guide module 1301 and the tertiary reflectors 1570', 1570" are elongated along the x-axis and can have a length L of about 2' or 4', corresponding to the size of conventional fluorescent light luminaires.

In this implementation, output surfaces of the optical extractor 1440 of the light guide module 1301, and corresponding reflective surfaces of the tertiary reflectors 1570', 1570" are shaped and arranged with respect to one another such that each of the tertiary reflectors 1570', 1570" appears to be uniformly lit to plants disposed directly in front, and along an optical axis, of the optical extractor. For example, a ratio of maximum luminance to minimum luminance across each of the tertiary reflectors 1570', 1570" can be lower than 5:1, 4:1 or 3:1. In this manner, the observer can view a fully lit surface of each of the tertiary reflectors 1570', 1570" free of dark regions and/or hot spots.

Figure 14A:
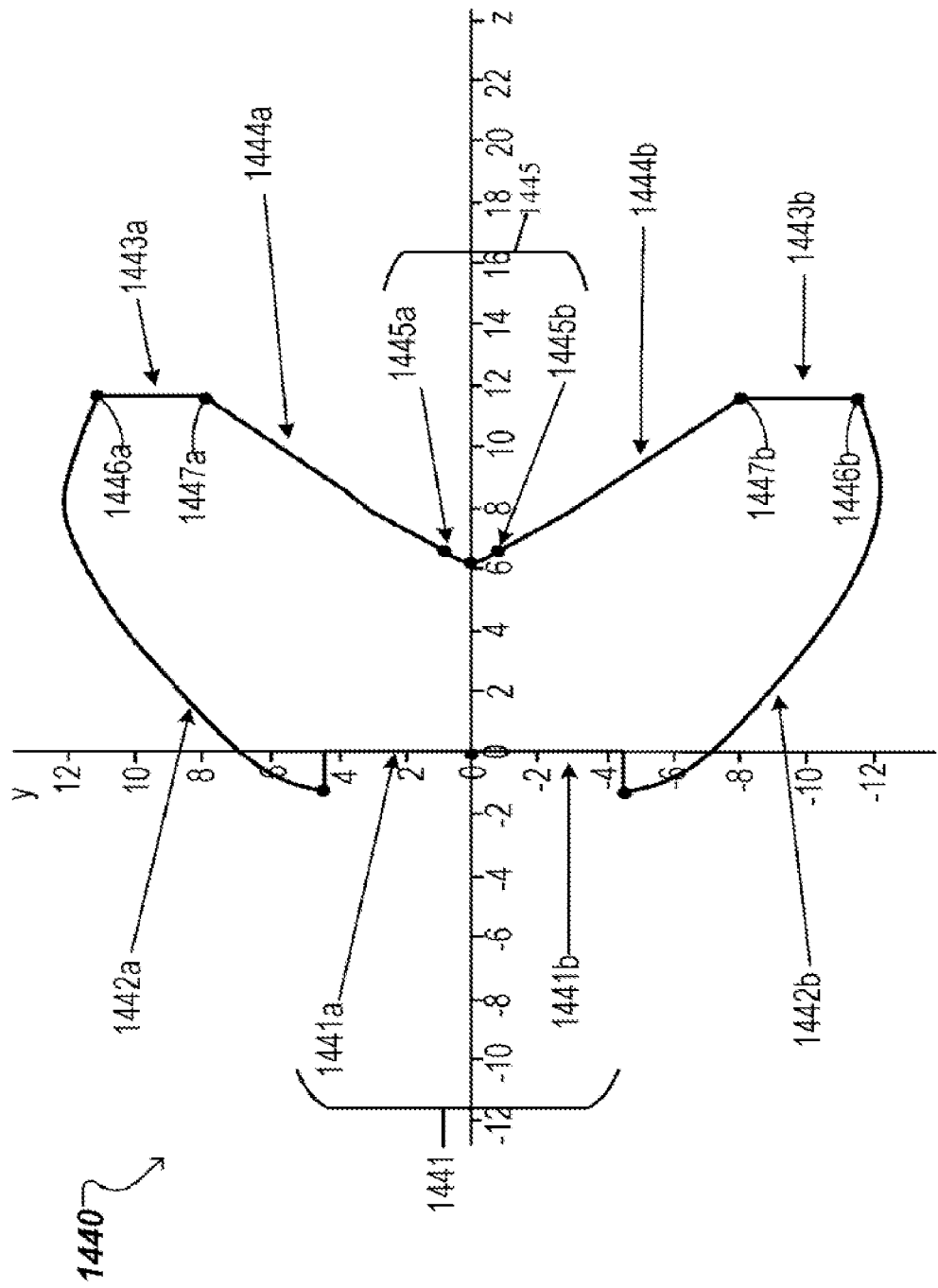
FIGS. 14A-14F and 15 show aspects of components of the configuration of the third embodiment of the disclosed technologies.

FIG. 14A is a cross-section in the (y-z) plane of an example implementation of the optical extractor 1440 of the light guide module 1301. The optical extractor 1440 is formed from a solid material (with refractive index n>1). For example, the material can be glass with a refractive index of about 1.5. As another example, the material can be plastic with a refractive index of about 1.5-1.6. In this implementation, the optical extractor 1440 includes an input surface 1441 centered on the optical axis of the light guide (here, the z-axis); a first backward output surface 1442a and a second backward output surface 1442b arranged to mirror each other relative to the z-axis; a first forward output surface 1443a and a second forward output surface 1443b arranged to mirror each other relative to the z-axis; a first redirecting surface 1444a and a second redirecting surface 1444b arranged to mirror each other relative to the z-axis; and a third forward output surface 1445 centered on the z-axis and opposing the input surface. Note that the first/second backward output surface 1442a/1442b intersects the first/second forward output surface 1443a/1443b at edge 1446a/1446b. Additionally, the first/second redirecting surface 1444a/1444b intersects the first/second forward output surface 1443a/1443b at vertex 1447a/1447b.

Figure 14B:
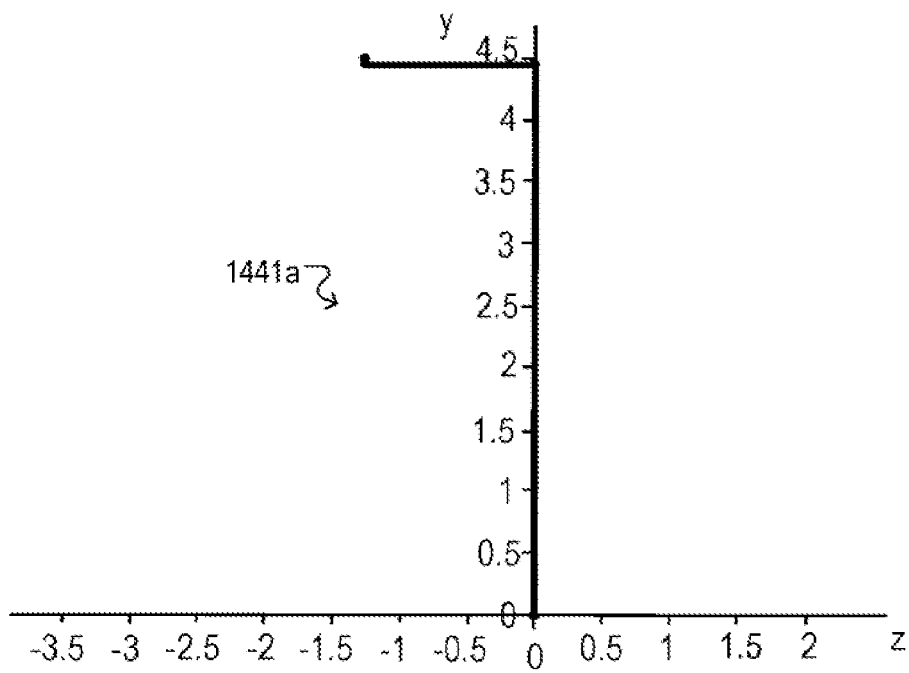

The input surface 1441 is formed from a first input interface 1441a (also referred to as the 1st interface), which is represented above the z-axis in this example, and a second input interface 1441b (also referred to as the 2nd interface), which is represented below the z-axis in this example. FIG. 14B is a cross-section in the (y-z) plane of the 1st interface 1441a—the z and y axes have different scaling. Coordinates of a polyline corresponding to the 1st interface 1441a are given in Table 1. Coordinates of another polyline corresponding to the 2nd interface 1441b have sign-opposite y-values and same z-values as the coordinates given in Table 1.

TABLE 1

1st interface 1441a

| Point | z (mm) | y (mm) |
|---|---|---|
| 1 | 0 | 0 |
| 2 | 0 | 4.45 |
| 3 | −1.25 | 4.45 |
| 4 | −1.25 | 4.50 |

The input surface 1441 of the optical extractor 1440 can be bonded to an output end of the light guide of the light guide module 1401 (e.g., as described above in connection with FIG. 7A). In such case, an anti-reflective coating may be disposed between the output end of the light guide and optical extractor 1440. If the material of the optical extractor 1440 is different from the material from which the light guide is formed, for example an index-matching layer may be disposed between the output end of the light guide and optical extractor 1440. In other cases, the light guide and the optical extractor 1440 can be integrally formed.

Figure 14C:
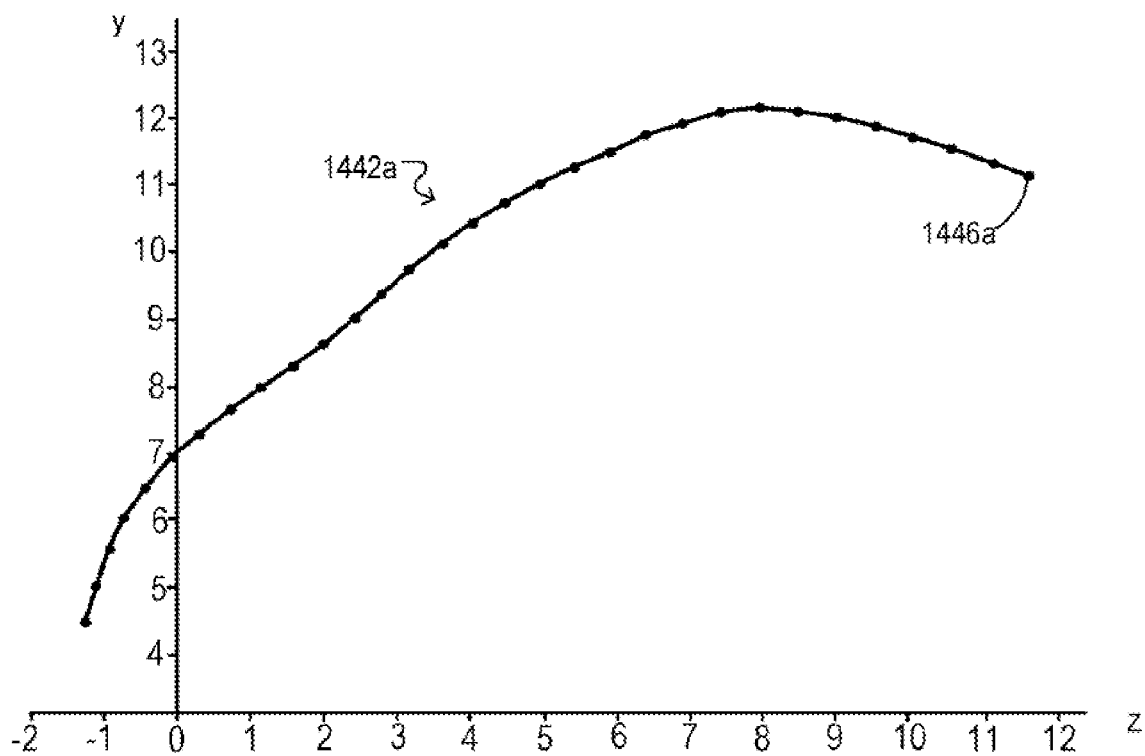

FIG. 14C is a cross-section in the (y-z) plane of the 1st backward output surface 1442a. Coordinates of nodes for a fitted curve, e.g., a spline, corresponding to the first backward output surface 1442a are given in Table 2. Coordinates of another spline corresponding to the 2nd backward output surface 1442b have sign-opposite y-values and same z-values as the coordinates given in Table 2.

TABLE 2

1st backward output surface 1442a

| Point | z (mm) | y (mm) |
|---|---|---|
| 1 | −1.25 | 4.5 |
| 2 | −1.11 | 5.02 |
| 3 | −0.94 | 5.54 |
| 4 | −0.72 | 6.04 |
| 5 | −0.44 | 6.50 |
| 6 | −0.09 | 6.92 |
| 7 | 0.30 | 7.29 |
| 8 | 0.72 | 7.64 |
| 9 | 1.15 | 7.97 |
| 10 | 1.56 | 8.31 |
| 11 | 1.99 | 8.65 |
| 12 | 2.34 | 9.01 |
| 13 | 2.79 | 9.39 |
| 14 | 3.19 | 9.75 |
| 15 | 3.60 | 10.11 |
| 16 | 4.03 | 10.44 |
| 17 | 4.48 | 10.74 |
| 18 | 4.95 | 11.02 |
| 19 | 5.43 | 11.27 |
| 20 | 5.92 | 11.51 |
| 21 | 6.41 | 11.74 |
| 22 | 6.91 | 11.95 |
| 23 | 7.43 | 12.10 |
| 24 | 7.97 | 12.15 |
| 25 | 8.51 | 12.11 |
| 26 | 9.05 | 12.00 |
| 27 | 9.57 | 11.87 |
| 28 | 10.09 | 11.71 |
| 29 | 10.60 | 11.54 |
| 30 | 11.11 | 11.35 |
| 31 | 11.62 | 11.16 |

Here, the first/second backward output surface 1442a/1442b of the optical extractor 1440 is convex and, along with the first/second redirecting surface 1444a/1444b and a reflective surface of the first/second tertiary reflector 1570'/1570", plays a major role in determining the luminance uniformity across the first/second tertiary reflector. Note that point 31 of the first/second backward output surface 1442a/1442b corresponds to the edge 1446a/1446b where the first/second backward output surface intersects the first/second forward output surface 1443a/1443b. In some implementations, the first/second backward output surface 1442a/1442b is uncoated. In other implementations, an anti-reflective coating may be provided on the first/second backward output surface 1442a/1442b such that light reflected by the first/second redirecting surface 1444a/1444b can transmit with minimal back reflection. In other implementations, the first/second backward output surface 1442a/1442b is coated with a diffusive coating (e.g., BrightView M PRO5™ or BrightView M PR10™). In such cases, the light reflected by the first/second redirecting surface 1444a/1444b can diffuse upon transmission through the first/second backward output surface 1442a/1442b.

Figure 14D:
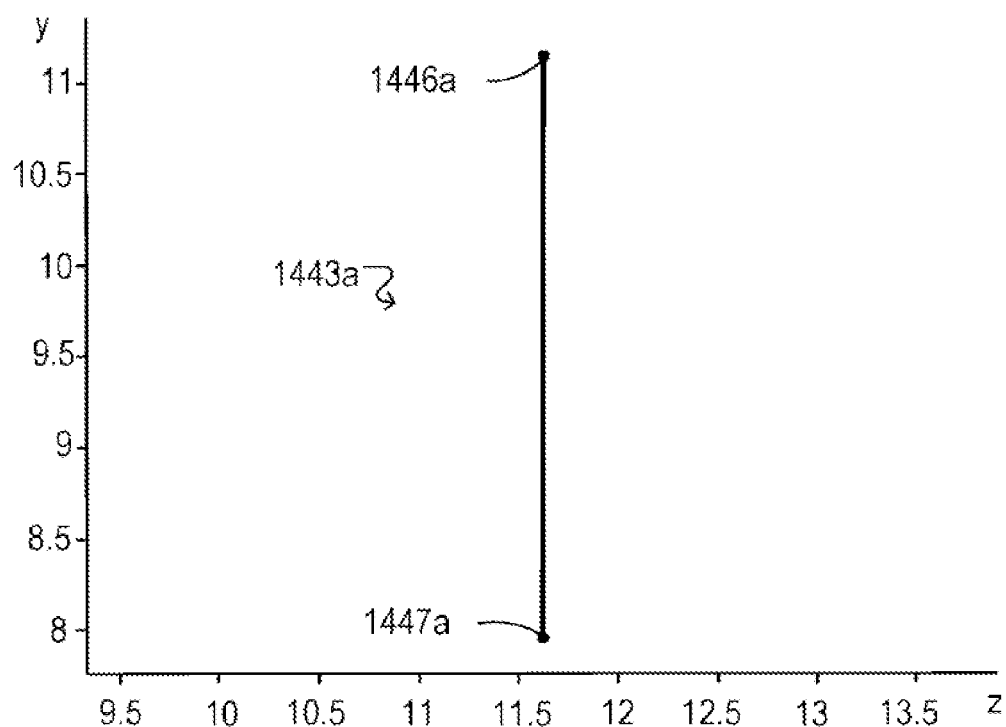

FIG. 14D is a cross-section in the (y-z) plane of the 1st forward output surface 1443a. Coordinates of a polyline corresponding to the first forward output surface 1443a are given in Table 3. Coordinates of another polyline corresponding to the 2nd forward output surface 1443a have sign-opposite y-values and same z-values as the coordinates given in Table 3.

TABLE 3

| 1ˢᵗ forward output surface 1443a | | |
|---|---|---|
| Point | z (mm) | y (mm) |
| 1 | 11.62 | 11.16 |
| 2 | 11.62 | 7.97 |

Here, the first/second forward output surface 1443a/1443b of the optical extractor 1440 is flat (or has a curvature that varies around zero). Note that point 1 of the first/second forward output surface 1443a/1443b corresponds to the edge 1446a/1446b where the first/second forward output surface intersects the first/second backward output surface 1442a/1442b; point 2 of the first/second forward output surface 1443a/1443b corresponds to the vertex 1447a/1447b where the first/second forward output surface intersects the first/second redirecting surface 1444a/1444b. In some implementations, the first/second forward output surface 1443a/1443b is uncoated. In other implementations, an anti-reflective coating may be provided on the first/second forward output surface 1443a/1443b such that guided light provided through the input surface 1441 that reaches the first/second forward output surface can transmit there through with minimal back reflection. In other implementations, the first/second forward output surface 1443a/1443b is coated with a diffusive coating (e.g., BrightView M PRO5™ or BrightView M PR10™). In such cases, guided light provided through the input surface 1441 that reaches the first/second forward output surface 1443a/1443b can diffuse upon transmission there through.

Figure 14E:
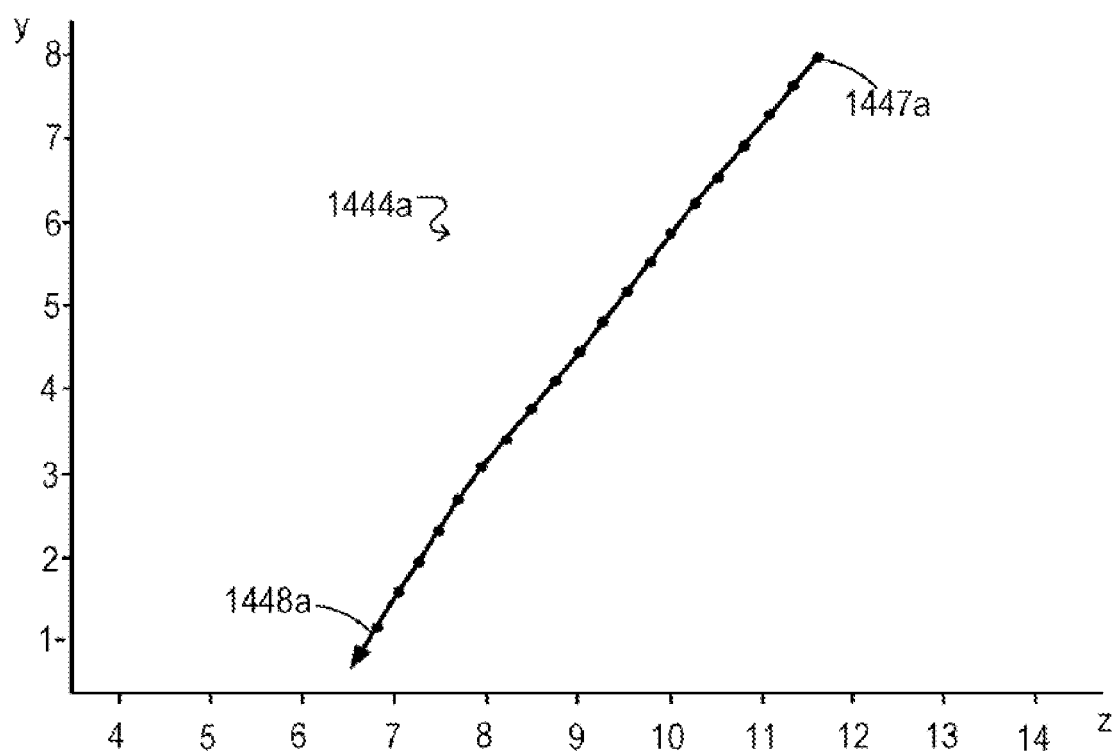

FIG. 14E is a cross-section in the (y-z) plane of the 1st redirecting surface 1444a. Coordinates of nodes for a fitted curve, e.g., a spline, corresponding to the first redirecting surface 1444a are given in Table 4. Coordinates of another spline corresponding to the 2nd redirecting surface 1444b have sign-opposite y-values and same z-values as the coordinates given in Table 4.

TABLE 4

| 1ˢᵗ redirecting surface 1444a | | |
|---|---|---|
| Point | z (mm) | y (mm) |
| 1 | 11.62 | 7.97 |
| 2 | 11.35 | 7.62 |
| 3 | 11.09 | 7.28 |
| 4 | 10.82 | 6.93 |
| 5 | 10.56 | 6.58 |
| 6 | 10.29 | 6.23 |
| 7 | 10.03 | 5.88 |
| 8 | 9.78 | 5.52 |
| 9 | 9.53 | 5.17 |
| 10 | 9.27 | 4.81 |
| 11 | 9.02 | 4.45 |
| 12 | 8.76 | 4.10 |
| 13 | 8.49 | 3.76 |
| 14 | 8.23 | 3.41 |
| 15 | 7.96 | 3.06 |
| 16 | 7.71 | 2.70 |
| 17 | 7.49 | 2.32 |
| 18 | 7.29 | 1.94 |
| 19 | 7.05 | 1.57 |
| 20 | 6.81 | 1.20 |
| 21 | 6.60 | 0.82 |

Here, the first/second redirecting surface 1444a/1444b of the optical extractor 1440 is flat (i.e., has a curvature that varies around zero) or it is concave and, along with the first/second backward output surface 1442a/1442b and a reflective surface of the first/second tertiary reflector 1570'/1570", plays a major role in determining the luminance uniformity across the first/second tertiary reflector. Note that point 1 of the first/second redirecting surface 1444a/1444b corresponds to the vertex 1447a/1447b where the first/second redirecting surface intersects the first/second forward output surface 1443a/1443b. In some implementations, the first/second redirecting surface 1444a/1444b is uncoated. In such cases, guided light from the input surface 1441 that impinges on the first/second redirecting surface 1444a/1444b at angles beyond a critical angle $\theta = \arcsin(1/n)$ relative to the respective surface normal reflects off the first/second redirecting surface via total internal reflection (TIR) towards the first/second backward output surface 1442a/1442b. In other implementations, the first/second redirecting surface 1444a/1444b is coated with a reflective coating. In such cases, guided light from the input surface 1441 that impinges on the first/second redirecting surface 1444a/1444b reflects off via specular reflection or diffuse reflection or a combination thereof towards the first/second backward output surface 1442a/1442b.

Figure 14F:
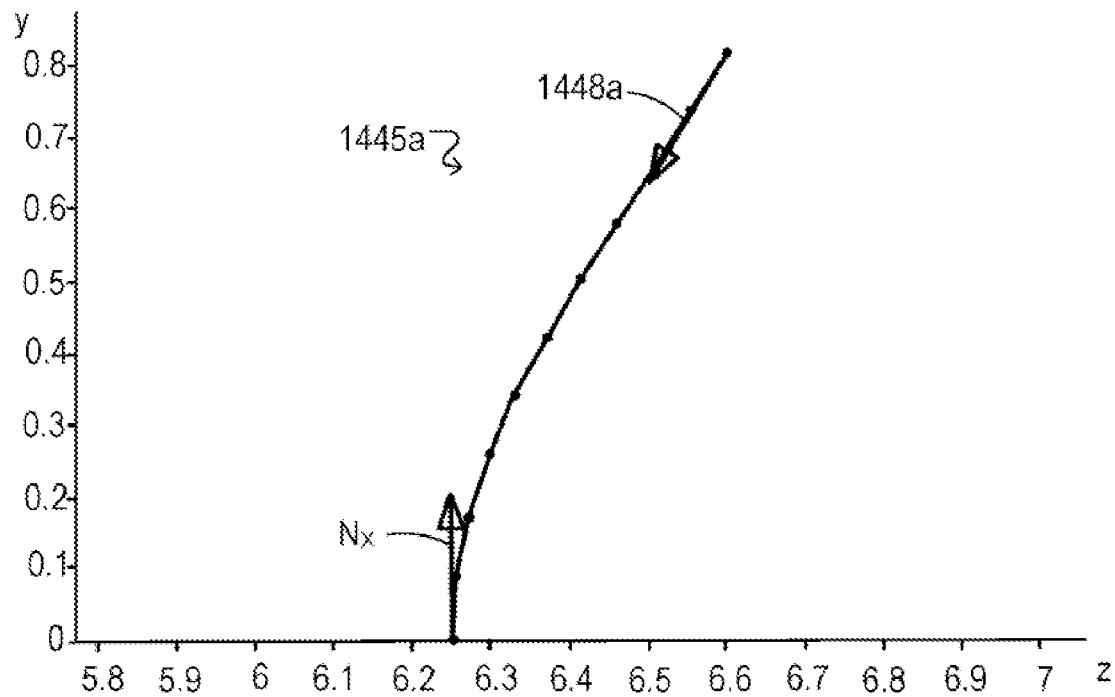

FIG. 14F is a cross-section in the (y-z) plane of a portion 1445a of the third forward output surface 1445. Coordinates of nodes for a fitted curve, e.g., a spline, corresponding to the portion 1445a of the third forward output surface 1445 are given in Table 5. Coordinates of another spline corresponding to portion 1445b of the third forward output surface 1445 have sign-opposite y-values and same z-values as the coordinates given in Table 5.

TABLE 5 portion 1445a of third forward output surface 1445

| Point | z (mm) | y (mm) |
|---|---|---|
| 1 | 6.60 | 0.81 |
| 2 | 6.56 | 0.74 |
| 3 | 6.51 | 0.66 |
| 4 | 6.46 | 0.58 |
| 5 | 6.42 | 0.50 |
| 6 | 6.37 | 0.42 |
| 7 | 6.33 | 0.34 |
| 8 | 6.30 | 0.26 |
| 9 | 6.27 | 0.17 |
| 10 | 6.26 | 0.09 |
| 11 | 6.25 | 0 |

Here, the third forward output surface 1445 of the optical extractor 1440 is concave. Note that slope 1448a (and 1448b—not shown in FIG. 14A or 14F) is continuous at the intersection of the portion 1445a/1445b of third forward output surface 1445 with the first/second redirecting surface 1444a/1444b. In this manner, there are no vertices between the third forward output surface 1445 and the adjacent first and second redirecting surfaces 1444a, 1444b. Also note that the third forward output surface 1445 intersects the z-axis with a slope parallel to the y-axis. In some implementations, the third forward output surface 1445 is uncoated. In other implementations, an anti-reflective coating may be provided on the third forward output surface 1445 such that guided light provided through the input surface 1441 that reaches the third forward output surface can transmit there through with minimal back reflection. In other implementations, the third forward output surface 1445 is coated with a diffusive coating (e.g., BrightView M PRO5™ or BrightView M PR10™). In such cases, guided light provided through the input surface 1441 that reaches the third forward output surface 1445 can diffuse upon transmission there through.

Note that a total depth of the optical extractor 1440 in the forward direction (e.g., along the z-axis) is less than 14 mm (or about 0.5"), and a total width of the optical extractor in an orthogonal direction (e.g., along the y-axis) is about 24 mm (or less than 1").

Figure 15:
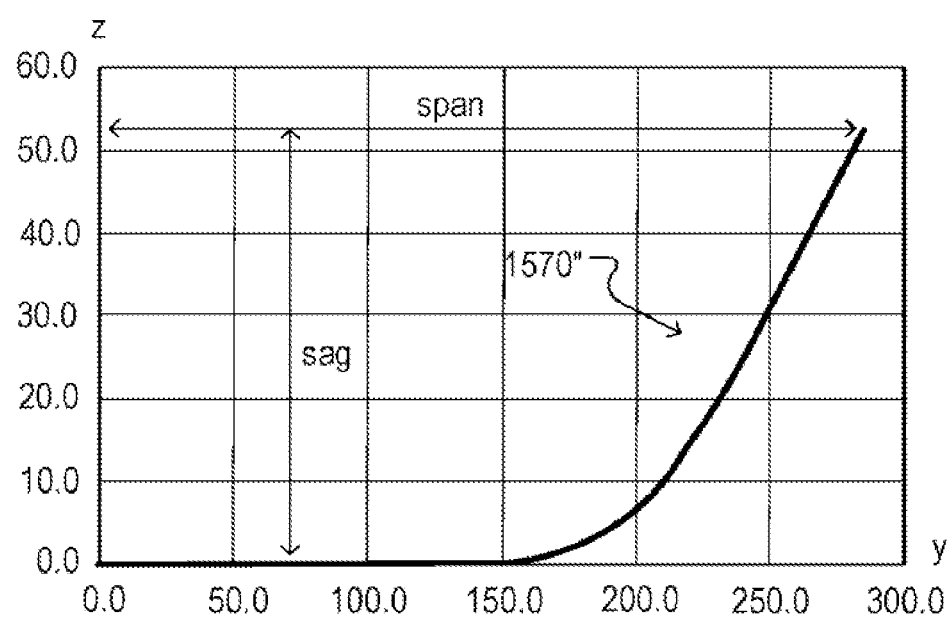

FIG. 15 is a cross-section in the (y-z) plane of the reflective surface of the second tertiary reflector 1570". Coordinates of nodes for a fitted curve, e.g., a spline, corresponding to the reflective surface of the second tertiary reflector 1570" are given in Table 6. Coordinates of another spline corresponding to the reflective surface of the first tertiary reflector 1570' have sign-opposite y-values and same z-values as the coordinates given in Table 6.

TABLE 6 reflective surface of second tertiary reflector 1570"

| Point | y (mm) | z (mm) |
|---|---|---|
| 1 | 0 | 0 |
| 2 | 9.5 | 0 |
| 3 | 19.0 | 0 |
| 4 | 28.5 | 0 |
| 5 | 38.0 | 0 |
| 6 | 47.5 | 0 |
| 7 | 57.0 | 0 |
| 8 | 66.5 | 0 |
| 9 | 76.0 | 0 |
| 10 | 85.5 | 0 |
| 11 | 95.0 | 0 |
| 12 | 104.5 | 0 |
| 13 | 114.0 | 0 |
| 14 | 123.5 | 0 |
| 15 | 133.0 | 0 |
| 16 | 142.5 | 0 |
| 17 | 152.0 | −0.01 |
| 18 | 161.5 | 0.41 |
| 19 | 171.0 | 1.19 |
| 20 | 180.5 | 2.49 |
| 21 | 190.0 | 4.42 |
| 22 | 199.5 | 7.03 |
| 23 | 209.0 | 10.33 |
| 24 | 218.5 | 14.27 |
| 25 | 228.0 | 18.78 |
| 26 | 237.5 | 23.77 |
| 27 | 247.0 | 29.10 |
| 28 | 256.5 | 34.67 |
| 29 | 266.0 | 40.40 |
| 30 | 275.5 | 46.28 |
| 31 | 285.0 | 52.39 |

Here, the reflective surface of the first/second tertiary reflector 1570'/1570" is concave and, along with the first/second redirecting surface 1444a/1444b and the first/second backward output surface 1442a/1442b of the optical extractor 1440, plays a major role in determining the luminance uniformity across the first/second tertiary reflector. In this embodiment of the first/second tertiary reflector 1570'/1570" a portion of the reflective surface adjacent to the housing is flat and a remaining portion of the reflective surface that is remote from the housing 1402 is concave. The reflective surface of the first/second tertiary reflector 1570'/1570" is coated with a reflective coating. In such cases, light from the first/second backward output surface 1442a/1442b of the optical extractor 1440 that impinges on the reflective surface of the first/second tertiary reflector 1570'/1570" reflects off via specular reflection or diffuse reflection or a combination thereof towards the first/second backward output surface 1442a/1442b. An example of diffusive coatings that can be used to cover the reflective surface of the first/second tertiary reflector 1570'/1570" is WhiteOptics White 98 F16™ (high angle diffusive film).

Note that a sag in the forward direction (e.g., along the z-axis) of the first/second tertiary reflector 1570'/1570" is less than 55 mm (or about 2"), and a span in an orthogonal direction (e.g., along the y-axis) of the first/second tertiary reflector is 285 mm (or about than 11"). The latter dimension of the first/second tertiary reflector 1570'/1570" and a thickness (along the y-axis) of order less than 1" for the housing 1402 that supports the light guide module 1401 and the first and second tertiary reflectors causes the lighting system 1300 to have a total span (along the y-axis) of 23-24". The forward output surfaces 1443a/b of the extractor in this example are located at about 90% of the sag that is at z~47 mm. The forward output surfaces 1443a/b of the extractor may be located between 70% to 95% of the sag, that is between about z~36 mm to z 50 mm with varying effects on the uniform appearance of respective lighting systems.

The above-described combination of shapes and relative orientations of the first/second redirecting surface 1444a/1444b and the first/second backward output surface 1442a/1442b of the optical extractor 1440 and of the reflective surface of the first/second tertiary reflector 1570'/1570" was used to design the lighting system 1300 for which a ratio of maximum luminance to minimum luminance across each of the tertiary reflectors 1570', 1570" is lower than 3:1, as shown above in connection with FIG. 5C.

Moreover, (i) a choice of diffusive coatings applied on the transmissive first/second backward output surface 1442a/1442b of the optical extractor 1440 of the light guide module 1401 and reflective surface of the first/second tertiary reflector 1570'/1570"—which influences, at least in part, a total amount of indirect light visible by an observer in front of the lighting system 1300—and (ii) another choice of diffusive coatings applied on the transmissive first/second forward output surface 1443a/1443b and third forward output surface 1445 of the optical extractor—which influences, at least in part, a total amount of direct light visible by the observer in front of the lighting system—were made to design the lighting system 1300 for which another ratio of maximum luminance to minimum luminance across each of the tertiary reflectors 1570', 1570" and the bottom side of the optical extractor is lower than 15:1, as shown above in connection with FIG. 5C.

Other lighting systems that use a light guide module and only a single tertiary reflector also can be designed to satisfy specified luminance uniformities, as described below.

Figure 16A:
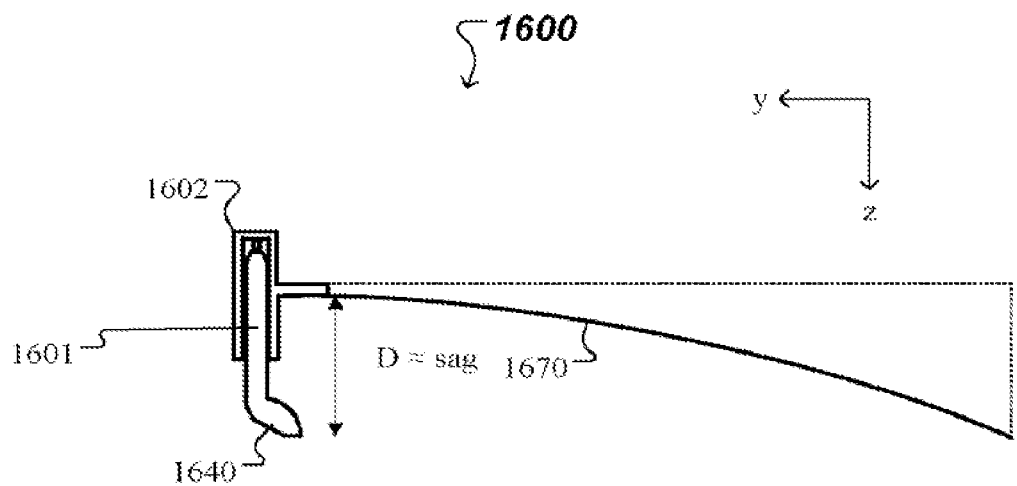
FIGS. 16A-16B show aspects of a configuration of the fourth embodiment of the disclosed technologies.

FIG. 16A shows a side view of an example lighting system 1600 that includes a light guide module 1601 and a single tertiary reflector 1670. Lighting system 1600 can be used as (a portion of) the lighting system 500B described above, where the light guide module 1601 and the tertiary reflector 1670 correspond to either of the light guide modules 501A, 501B and reflector 516, respectively. Solid state light sources, optical couplers and a light guide of the light guide module 1601 can be implemented like the corresponding components of the light guide module 201* described above in connection with FIG. 7B. An optical extractor 1640 of the light guide module 1601 lacks mirror symmetry relative to the optical axis of the light guide module 1601 (parallel to the z axis) and can be implemented as described below in connection with FIG. 16B. A "front face" (referred to as a reflective surface) of the tertiary reflector 1670, that faces the light guide module 1601, can be implemented in a manner similar to the one described above in connection with FIG. 16A, while a "rear face" can be implemented as a solid block or can have other forms/shapes. Note that while the plurality of solid state light sources and the optical couplers of the light guide module 1601 are housed within the housing 1602, the light guide of light guide module protrudes from the housing to lower the optical extractor 1640 of light guide module by a distance D along the z-axis comparable to a sag of the tertiary reflector 1670 in the (y,z) plane. The light guide module 1601 and the tertiary reflector 1670 are elongated along the x-axis (e.g., as shown in FIG. 7B) and can have a length L of about 2' or 4', corresponding to the size of conventional fluorescent light luminaires.

In this implementation, output surfaces of the optical extractor 1640 of the light guide module 1601, and the reflective surface of the tertiary reflector 1670 are shaped and arranged with respect to one other such that the tertiary reflector 1670 appears to be uniformly lit when "viewed" by plant 502 associated with the lighting system 500B implemented as 1600 from directly in front, and along an optical axis, of the optical extractor. For example, a ratio of maximum luminance to minimum luminance across the tertiary reflector 1670 can be lower than 5:1, 4:1 or 3:1. In this manner, the observer can view a fully lit surface of the tertiary reflector 1670 free of dark regions and/or hot spots.

Figure 16B:
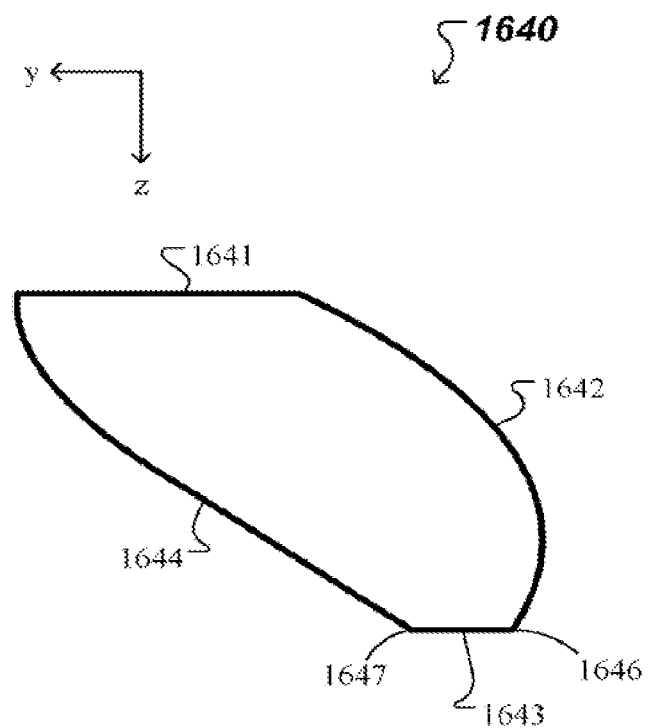

FIG. 16B is a cross-section in the (y-z) plane of an example implementation of the optical extractor 1640 of the light guide module 1601. Note that the optical extractor 1640 is a single-sided optical extractor like the optical extractor 240* described above in connection with FIG. 7B. The optical extractor 1640 is formed from a solid material (with refractive index n>1). For example, the material can be glass with a refractive index of about 1.5. As another example, the material can be plastic with a refractive index of about 1.5-1.6. In this implementation, the optical extractor 1640 includes an input surface 1641 centered on the optical axis of the light guide (here, the z-axis); a forward output surface 1643 opposing the input surface 1641; a backward output surface 1642 extending from the input surface 1641 to the forward output surface 1643; and a redirecting surface 1644 extending from the input surface 1641 to the forward output surface 1643 and opposing the backward output surface 1642. Note that the backward output surface 1642 intersects the forward output surface 1643 at edge 1646. Additionally, redirecting surface 1644 intersects the forward output surface 1643 at vertex 1647.

The input surface 1641 of the optical extractor 1640 can be bonded to an output end of the light guide of the light guide module 1601 (e.g., as described above in connection with FIG. 7B). In such case, an anti-reflective coating may be disposed between the output end of the light guide and optical extractor 1640. The light guide and the optical extractor 1640 can be integrally or separately formed, for example. If the optical extractor 1640 and the light guide are formed as separate components from like materials, an index matching layer may be disposed between the output end of the light guide and optical extractor 1640.

The backward output surface 1642 of the optical extractor 1640 is convex and, along with the redirecting surface 1644 and the reflective surface of the tertiary reflector 1670, plays a major role in determining the luminance uniformity across the tertiary reflector. In some implementations, the backward output surface 1642 is uncoated. In other implementations, an anti-reflective coating may be provided on the backward output surface 1642 such that light reflected by the redirecting surface 1644 can transmit with minimal back reflection. In other implementations, the backward output surface 1642 is coated with a diffusive coating (e.g., BrightView M PRO5™ or BrightView M PR10™). In such cases, the light reflected by the redirecting surface 1644 can diffuse upon transmission through the backward output surface 1642.

The forward output surface 1643 of the optical extractor 1640 is flat (or has a curvature that varies around zero). In some implementations, the forward output surface 1643 is uncoated. In other implementations, an anti-reflective coating may be provided on the forward output surface 1643 such that guided light provided through the input surface 1641 that reaches the forward output surface can transmit there through with minimal back reflection. In other implementations, the forward output surface 1643 is coated with a diffusive coating (e.g., BrightView M PRO5™ or BrightView M PR10™). In such cases, guided light provided through the input surface 1641 that reaches the forward output surface 1643 can diffuse upon transmission there through.

The redirecting surface 1644 of the optical extractor 1640 has a complex shape and, along with the backward output surface 1642 and the reflective surface of the tertiary reflector 1670, plays a major role in determining the luminance uniformity across the tertiary reflector. For example, the redirecting surface 1644 is flat (i.e., has a curvature that varies around zero) over a portion adjacent the forward output surface 1643 and convex over another portion adjacent the input surface 1641. As another example, the redirecting surface 1644 has an inflection point, i.e., is concave over a portion adjacent the forward output surface 1643 and convex over another portion adjacent the input surface 1641.

In some implementations, the redirecting surface 1644 is uncoated. In such cases, guided light from the input surface 1641 that impinges on the redirecting surface 1644 at angles beyond a critical angle θ=arcsine(1/n) relative to the respective surface normal reflects off the first/second redirecting surface via total internal reflection (TIR) towards the backward output surface 1642. In other implementations, the redirecting surface 1644 is coated with a reflective coating. In such cases, guided light from the input surface 1641 that impinges on the redirecting surface 1644 reflects off via specular reflection or diffuse reflection or a combination thereof towards the backward output surface 1642.

Referring again to FIG. 16A, the reflective surface of the tertiary reflector 1670 is concave and, along with the redirecting surface 1644 and the backward output surface 1642 of the optical extractor 1640, plays a major role in determining the luminance uniformity across the tertiary reflector. The reflective surface of the tertiary reflector 1670 is coated with a reflective coating. In such cases, light from the backward output surface 1642 of the optical extractor 1640 that impinges on the reflective surface of the tertiary reflector 1670 reflects off via specular reflection or diffuse reflection or a combination thereof towards the first/second backward output surface 1442a/1442b. An example of diffusive coating that can be used to cover the reflective surface of the tertiary reflector 1670 is WhiteOptics White 98 F16™ (high angle diffusive film).

The above-described combination of shapes and relative orientations of the redirecting surface 1644 and the backward output surface 1642 of the optical extractor 1640 and of the reflective surface of the tertiary reflector 1670 can be used to design the lighting system 1600 for which a ratio of maximum luminance to minimum luminance across the tertiary reflector 1670 is lower than a first specified uniformity ratio, e.g., 3:1.

Moreover, (i) a choice of diffusive coatings applied on the transmissive backward output surface 1642 of the optical extractor 1640 of the light guide module 1601 and the reflective surface of the tertiary reflector 1670—which influences, at least in part, a total amount of indirect light visible by a plant 502 in front of the lighting system 500B implemented as lighting system 1600—and (ii) another choice of diffusive coatings applied on the transmissive forward output surface 1642 of the optical extractor—which influences, at least in part, a total amount of direct light visible by the observer in front of the lighting system—can be made to design the lighting system 1600 for which another ratio of maximum luminance to minimum luminance across the tertiary reflector 1670 and the bottom side of the optical extractor is lower than a second specified uniformity ratio, e.g., 15:1.

Samples of the lighting system 1300, described above in connection with FIGS. 13A-13B, 14A-14F and 15, have been fabricated and experiments have been conducted to evaluate their respective performance. Some of these experiments are summarized above in connection with FIG. 5C.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

We claim:

1. A plant growth lighting system comprising:
   a. a plant support configured to support one or more plants;
   b. a lighting module comprising a light emitting element (LEE), a light guide having a first end and a second end, the light guide arranged to receive light from the LEE at the first end and configured to guide the received light along a first direction to the second end, and an extractor having an input end and an output end, the input end arranged to receive light from the second end of the light guide and the extractor configured to output light from the lighting module through the output end; and
   c. a reflector module arranged to receive at least a portion of light output by the extractor and reflect the light towards the plant support,
   wherein the light reflected from the reflector module towards the plant support has a light distribution that is uniform along an optical axis of the lighting module corresponding to the first direction.

2. The plant growth lighting system of claim 1, wherein the light reflected from the reflector module towards the plant support uniformly illuminates a surface of the plant support.

3. The plant growth lighting system of claim 1, wherein the extractor is uniformly shaped along a length of the plant support.

4. The plant growth lighting system of claim 1, wherein both the lighting module and the reflector module uniformly extend along a length of the plant support.

5. The plant growth lighting system of claim 4, wherein at least some of the light output by the extractor propagates in a direction at an obtuse angle relative to the first direction.

6. The plant growth lighting system of claim 4, wherein the extractor is configured to output light only on a first side of a plane parallel to both the first direction and the length of the plant support.

7. The plant growth lighting system of claim 4, wherein the extractor is configured to output light on both a first side and on a second side of a plane parallel to both the first direction and the length of the plant support.

8. The plant growth lighting system of claim 7, wherein the reflector module is arranged on both the first side and the second side of the plane.

9. The plant growth lighting system of claim 7, wherein the lighting module is arranged within a perimeter of the plant support.

10. The plant growth lighting system of claim 1, wherein the plant support comprises a flat surface and the first direction is perpendicular to the flat surface.

11. The plant growth lighting system of claim 10, wherein the one or more plants are arranged on the flat surface.

12. The plant growth lighting system of claim 10, wherein the reflector module comprises a diffusively reflecting surface.

13. The plant growth lighting system of claim 4, wherein at least some of the reflected light from the reflector module propagates in a direction at an obtuse angle relative to the first direction.

14. The plant growth lighting system of claim 1, further comprising an additional lighting module, wherein the lighting module and the additional lighting module are arranged parallel to each other.

15. The plant growth lighting system of claim 1, wherein the lighting module is arranged outside of a perimeter of the plant support.

* * * * *